United States Patent
Okinaka et al.

(10) Patent No.: US 6,830,635 B2
(45) Date of Patent: Dec. 14, 2004

(54) SPINDLE-SHAPED GOETHITE PARTICLES, SPINDLE-SHAPED HEMATITE PARTICLES, SPINDLE-SHAPED MAGNETIC METAL PARTICLES CONTAINING IRON AS MAIN COMPONENT AND PROCESSES FOR PRODUCING THE SAME

(75) Inventors: Kenji Okinaka, Ube (JP); Masayuki Uegami, Onoda (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 157 days.

(21) Appl. No.: 09/878,311

(22) Filed: Jun. 12, 2001

(65) Prior Publication Data

US 2002/0031666 A1 Mar. 14, 2002

(30) Foreign Application Priority Data

Jun. 13, 2000 (JP) .................................. 2000-177377

(51) Int. Cl.[7] .............................. H01F 1/047; H01F 1/06
(52) U.S. Cl. ...................... 148/311; 148/301; 420/77; 420/83; 420/103; 75/351; 75/364; 75/365
(58) Field of Search .......................... 420/77, 83, 103; 148/301, 311; 75/351, 364, 365

(56) References Cited

U.S. PATENT DOCUMENTS

| 5,534,361 A | * | 7/1996 | Hisano et al. ......... 428/694 RE |
| 5,645,652 A | * | 7/1997 | Okinaka et al. ............ 148/307 |
| 6,048,412 A | | 4/2000 | Kurokawa et al. |
| 6,183,868 B1 | | 2/2001 | Kurokawa et al. |
| 6,309,479 B1 | * | 10/2001 | Okinaka et al. ............ 148/301 |
| 6,391,450 B1 | * | 5/2002 | Okinaka et al. ............ 428/402 |

FOREIGN PATENT DOCUMENTS

| DE | 197 17 560 | 10/1997 |
| EP | 0 125 150 | 11/1984 |
| EP | 0 999 185 | 3/1999 |
| EP | 0 940 369 | 9/1999 |

* cited by examiner

Primary Examiner—John P. Sheehan
(74) Attorney, Agent, or Firm—Nixon & Vanderhye P.C.

(57) ABSTRACT

The present invention relates to spindle-shaped goethite particles having an average major axial diameter of 0.05 to 0.18 μm, spindle-shaped hematite particles having an average major axial diameter of 0.05 to 0.17 μm, spindle-shaped magnetic metal particles containing iron as a main component, which exhibit an adequate coercive force, good dispersibility, good oxidation stability and excellent coercive force distribution notwithstanding the average major axial diameter thereof is as small as 0.05 to 0.15 μm, and processes for producing the respective particles. Especially, the spindle-shaped magnetic metal particles containing iron as a main component, have an average major axial diameter of 0.05 to 0.15 μm, an aspect ratio of from 5:1 to 9:1, a size distribution (standard deviation/average major axial diameter) of not more than 0.30, a crystallite size $D_{110}$ of 130 to 160 Å, a Co content of from 0.5 to less than 6 atm % based on whole Fe, an Al content of from more than 10 to less than 20 atm % based on whole Fe, a rare earth element content of from 1.5 to 5 atm % based on whole Fe, an atomic ratio of Al to Co of from more than 2 to 4, a coercive force of 111.4 to 143.2 kA/m, an oxidation stability of saturation magnetization (Δσs) of not more than 10%, and an ignition temperature of not less than 130° C.

6 Claims, 2 Drawing Sheets

SPINDLE-SHAPED GOETHITE PARTICLES, SPINDLE-SHAPED HEMATITE PARTICLES, SPINDLE-SHAPED MAGNETIC METAL PARTICLES CONTAINING IRON AS MAIN COMPONENT AND PROCESSES FOR PRODUCING THE SAME

BACKGROUND OF THE INVENTION

The present invention relates to spindle-shaped goethite particles, spindle-shaped hematite particles, spindle-shaped magnetic metal particles containing iron as a main component, and processes for producing the respective particles. More particularly, the present invention relates to spindle-shaped goethite particles having an average major axial diameter of 0.05 to 0.18 $\mu$m, spindle-shaped hematite particles having an average major axial diameter of 0.05 to 0.17 $\mu$m, spindle-shaped magnetic metal particles containing iron as a main component, which exhibit an adequate coercive force, good dispersibility, good oxidation stability and excellent coercive force distribution notwithstanding the average major axial diameter thereof is as small as 0.05 to 0.15 $\mu$m, and processes for producing the respective particles.

In recent years, recording-time prolongation, miniaturization and lightening of audio, video or computer magnetic recording and reproducing apparatuses for various magnetic recording media such as digital audio tapes (DAT) for people's livelihood use, 8-mm video tapes, Hi-8 tapes, VTR tapes for business use, computer tapes or discs thereof have proceeded more rapidly. In particular, VTRs (video tape recorders) are now widespread, so that there have been intensely developed VTRs aiming at the transfer of analog recording types into digital ones in addition to the above recording-time prolongation, miniaturization and lightening thereof. On the other hand, with such recent tendencies, the magnetic recording media have been required to have high image quality and high output characteristics, especially high frequency characteristics. To meet these requirements, it is necessary to reduce noise due to the magnetic recording media themselves and enhance residual magnetic flux density, coercive force, dispersibility, filling property and tape-surface smoothness thereof. Therefore, it ha been further required to improve S/N ratio of the magnetic recording media.

These properties of the magnetic recording media have a close relation to magnetic particles used therein. In recent years, magnetic metal particles containing iron as a main component have been noticed because such particles can show a higher coercive force and a larger saturation magnetization as compared to those of conventional magnetic iron oxide particles, and have been already used as magnetic particles for magnetic recording media such as DAT, 8-mm video tapes, Hi-8 tapes, video tapes for business use, computer tapes or discs. The magnetic metal particles containing iron as a main component conventionally used in DAT, 8-mm video tapes, Hi-8 tapes or the like have been required to be further improved in output characteristics and weather resistance. In addition, the magnetic metal particles containing iron as a main component must fulfill applicability to existing format and good economy at the same time. Therefore, it has been strongly required to provide magnetic metal particles containing iron as a main component capable of satisfying the above requirements while minimizing amounts of various metals added thereto.

Various properties of magnetic recording media are detailed below.

In order to obtain high image quality in video magnetic recording media, it has been required to enhance S/N ratio and video frequency characteristics thereof. For this reason, it is important to improve a surface smoothness of the magnetic recording media. For improving the surface smoothness, it is also required to improve a dispersibility of magnetic particles in coating composition as well as orientation and filling properties thereof in coating film. In addition, in order to enhance the video frequency characteristics, the magnetic recording media have been required to exhibit not only a high coercive force and a large residual magnetic flux density, but also an excellent S.F.D. (Switching Field Distribution), i.e., a small coercive force distribution. Further, the magnetic recording media are required to show good running property upon repeated use, good still property as well as high recording reliability even when used under severe environmental conditions, i.e., high durability.

As to the magnetic metal particles containing iron as a main component for magnetic recording media capable of satisfying the above various properties, those having a larger particle size are preferable from the standpoint of improvement in dispersibility and oxidation stability, while those having a smaller particle size are preferable from the standpoint of improvement in surface smoothness and reduction in noise. Thus, the smaller the particle size of the magnetic metal particles containing iron as a main component, the poorer the dispersibility and oxidation stability thereof. Also, when the particle size becomes smaller, the coercive force is usually increased. Therefore, it is necessary to appropriately control the particle size for attaining aimed magnetic properties. Further, it is preferable to incorporate a large amount of cobalt into the magnetic metal particles containing iron as a main component in the consideration of chemical composition thereof since as well known, which cobalt forms a solid solution with iron and contributes to improvement in oxidation stability. However, the use of a large amount of expensive cobalt is disadvantageous from economical viewpoint. Consequently, it has been demanded to provide magnetic metal particles containing iron as a main component exhibiting an adequate coercive force as well as excellent dispersibility and oxidation stability in spite of lessening contents of expensive metal elements such as cobalt and reducing the particle size.

As known in the arts, the magnetic metal particles containing iron as a main component are produced by heat-treating goethite particles, hematite particles obtained by heat-dehydrating the goethite particles, or particles obtained by incorporating different metal elements into the above goethite or hematite particles as starting material, if required, in a non-reducing atmosphere; and then heat-reducing the resultant particles in a reducing atmosphere. In this case, it is required that the magnetic metal particles containing iron as a main component still maintain shape and size of the goethite particles as starting material by appropriately controlling the shape and size of the goethite particles or by preventing heat fusion between particles upon heat-treatments such as heat-dehydration and heat-reduction, or deformation and breakage of each particle.

The starting goethite particles are classified into two kinds of goethite particles in accordance with configurations thereof, i.e., acicular goethite particles produced mainly from alkali hydroxide and spindle-shaped goethite particles produced mainly from alkali carbonate. The acicular goethite particles usually tend to have a large aspect ratio, but tend to be deteriorated in particle size distribution and become large in size as compared to spindle-shaped goethite particles. The particle size distribution is an index of uniformity of primary particles, and, therefore, has a close relationship with coercive force distribution and oxidation stability of the magnetic metal particles containing iron as a main component. Consequently, spindle-shaped goethite particles having an excellent particle size distribution are preferably used as the starting materials of the magnetic metal particles containing iron as a main component.

Under these circumstances, as magnetic metal particles containing iron as a main component used for audio or video magnetic recording media such as digital audio tapes (DAT) for people's livelihood use, 8-mm video tapes and Hi-8 tapes, there have been demanded such magnetic metal particles containing iron as a main component having an adequate coercive force of 111.4 to 143.2 kA/m (1,400 to 1,800 Oe) as well as good dispersibility and oxidation stability even when the content of expensive elements such as cobalt is lessened and the particle size is minimized in order to further improve the properties of the magnetic metal particles containing iron as a main component and pursue better economy.

As to compositions of magnetic metal particles containing iron as a main component for improving various properties thereof, there are known those specified in, e.g., Japanese Patent Application Laid-Open (KOKAI) Nos. 7-210856, 8-279142, 9-293233, 9-295814, 10-69629, 10-245233, 10-275326, 10-334455, 10-334457, 11-11951, 11-130439, 11-251122 or the like.

At present, it has been strongly required to provide spindle-shaped magnetic metal particles containing iron as a main component, which can exhibit an adequate coercive force of 111.4 to 143.2 kA/m (1,400 to 1,800 Oe), good dispersibility, good oxidation stability and excellent coercive force distribution in spite of fine particles, especially notwithstanding the average major axial diameter thereof is as small as 0.05 to 0.15 $\mu$m. However, such spindle-shaped magnetic metal particles containing iron as a main component cannot be obtained yet.

Namely, in the above-described KOKAIs, although the contents of Co, Al and rare earth element based on whole Fe are specified, there are no descriptions concerning relationship between the respective elements. These conventional despite fail to satisfy the above requirement of exhibiting an adequate coercive force, excellent dispersibility and excellent oxidation stability at the same time in spite of fine particles.

As a result of the present inventors' earnest studies for solving the above problems, it has been found that in the process for producing spindle-shaped goethite particles, comprising reacting an aqueous ferrous salt solution with a mixed aqueous alkali solution of an aqueous alkali carbonate solution and an aqueous alkali hydroxide solution; aging the resultant water suspension containing a ferrous-containing precipitate in a non-reducing atmosphere; passing an oxygen-containing gas through the water suspension to conduct an oxidation reaction thereof, thereby producing spindle-shaped goethite seed crystal particles; passing an oxygen-containing gas through the water suspension containing the spindle-shaped goethite seed crystal particles and the ferrous-containing precipitate to conduct an oxidation reaction thereof, thereby growing a goethite layer on the surface of each spindle-shaped goethite seed crystal particle, so that spindle-shaped goethite particles are obtained; and heat-treating the resultant spindle-shaped goethite particles in a non-reducing atmosphere; and then heat-reducing the obtained particles in a reducing atmosphere, by adding a Co compound in an amount of from 0.5 to less than 6 atm % (calculated as Co) based on whole Fe, to the water suspension containing the ferrous-containing precipitate during aging but prior to the elapse of half a period of the whole aging time before initiation of the oxidation reaction; conducting the oxidation reaction for producing the spindle-shaped goethite seed crystal particles, such that 40 to 50% of whole $Fe^{2+}$ is oxidized; adding an Al compound in an amount of from more than 10 to less than 20 atm % (calculated as Al) based on whole Fe, to the water suspension containing the spindle-shaped goethite seed crystal particles and ferrous-containing precipitate before initiation of the oxidation reaction, the thus obtained spindle-shaped magnetic metal particles containing iron as a main component can exhibit not only adequate coercive force, good dispersibility and good oxidation stability, but also excellent coercive force distribution notwithstanding the average major axial diameter thereof is as small as 0.05 to 0.15 $\mu$m. The present invention has been attained on the basis of this finding.

SUMMARY OF THE INVENTION

An object of the present invention is to provide fine spindle-shaped magnetic metal particles containing iron as a main component, which can exhibit not only adequate coercive force, good dispersibility and good oxidation stability, but also excellent coercive force distribution in spite of the average major axial diameter thereof of as small as 0.05 to 0.15 $\mu$m.

Another object of the present invention is to provide fine spindle-shaped hematite particles having an average major axial diameter of 0.05 to 0.17 $\mu$m and a specific crystallite size ratio, which are suitably used as a starting material of the fine spindle-shaped magnetic metal particles containing iron as a main component which can exhibit not only adequate coercive force, good dispersibility and good oxidation stability, but also excellent coercive force distribution.

Still another object of the present invention is to provide fine spindle-shaped goethite particles having an average major axial diameter of 0.05 to 0.18 $\mu$m, a relatively small aspect ratio and a specific crystallite size ratio, which are suitably used as a starting material of the fine spindle-shaped magnetic metal particles containing iron as a main component which can exhibit not only adequate coercive force, good dispersibility and good oxidation stability, but also excellent coercive force distribution.

To accomplish the aim, in a first aspect of the present invention, there are provided spindle-shaped goethite particles having an average minor axial diameter of 0.05 to 0.18 $\mu$m, an aspect ratio of from more than 6:1 to less than 10:1, a size distribution (standard deviation/average major axial diameter) of not more than 0.20, a Co content of from 0.5 to less than 6 atm % based on whole Fe; an Al content of from more than 10 to less than 20 atm % based on whole Fe, and an atomic ratio of Al to Co of from more than 2 to 4.

In a second aspect of the present invention, there are provided spindle-shaped goethite particles having an average major axial diameter of 0.05 to 0.18 $\mu$m, an aspect ratio of from more than 6:1 to less than 10:1, a size distribution (standard deviation/average major axial diameter) of not more than 0.20, a Co content of from 0.5 to less than 5 atm % based on whole Fe; an Al content of from 10.5 to less than 18 atm % based on whole Fe, an atomic ratio of Al to Co of from 2.10 to 3.90, a crystallite size $D_{020}$ of 150 to 250 Å, a crystallite size $D_{110}$ of 80 to 120 Å and a crystallite size ratio of $D_{020}/D_{110}$ of 1.8 to 2.4.

In a third aspect of the present invention, there are provided spindle-shaped hematite particles having an average major axial diameter of 0.05 to 0.17 μm, an aspect ratio of from more than 6:1 to less than 10:1, a size distribution (standard deviation/average major axial diameter) of not more than 0.22, a crystallite size $D_{104}$ of 100 to 140 Å, a Co content of from 0.5 to less than 6 atm % based on whole Fe; an Al content of from more than 10 to less than 20 atm % based on whole Fe, a rare earth element content of from 1.5 to 5 atm % based on whole Fe, and an atomic ratio of Al to Co of from more than 2 to 4.

In a fourth aspect of the present invention, there are provided spindle-shaped hematite particles having an average major axial diameter of 0.05 to 0.17 μm, an aspect ratio of from more than 6:1 to less than 10:1, a size distribution (standard deviation/average major axial diameter) of not more than 0.22, a crystallite size $D_{104}$ of 100 to 140 Å, a Co content of from 0.5 to less than 5 atm % based on whole Fe; an Al content of from 10.5 to less than 18 atm % based on whole Fe, a rare earth element content of from 2.0 to 4.8 atm % based on whole Fe, an atomic ratio of Al to Co of from 2.10 to 3.90, a crystallite size $D_{110}$ of 200 to 300 Å, and a crystallite size ratio of $D_{020}/D_{110}$ of 2.0 to 4.0.

In a fifth aspect of the present invention, there are provided spindle-shaped magnetic metal particles containing iron as a main component, having an average major axial diameter of 0.05 to 0.15 μm, an aspect ratio of from 5:1 to 9:1, a size distribution (standard deviation/average major axial diameter) of not more than 0.30, a crystallite size $D_{110}$ of 130 to 160 Å, a Co content of from 0.5 to less than 6 atm % based on whole Fe, an Al content of from more than 10 to less than 20 atm % based on whole Fe, a rare earth element content of from 1.5 to 5 atm % based on whole Fe, an atomic ratio of Al to Co of from more than 2 to 4, a coercive force of 111.4 to 143.2 kA/m, an oxidation stability of saturation magnetization (Δσs) of not more than 10%, and an ignition temperature of not less than 130° C.

In a sixth aspect of the present invention, there are provided spindle-shaped magnetic metal particles containing iron as a main component containing iron as a main component, having an average major axial diameter of 0.05 to 0.15 μm, an aspect ratio of from 5:1 to 9:1, a size distribution (standard deviation/average major axial diameter) of not more than 0.30, a crystallite size $D_{110}$ of 130 to 160 Å, a Co content of from 0.5 to less than 5 atm % based on whole Fe; an Al content of from 10.5 to less than 18 atm % based on whole Fe, a rare earth element content of from 2.0 to 4.8 atm % based on whole Fe, an atomic ratio of Al to Co of from 2.10 to 3.90, a coercive force of 111.4 to 143.2 kA/m, an oxidation stability of saturation magnetization (Δσs) of not more than 10%, and an ignition temperature of not less than 130° C.

In a seventh aspect of the present invention, there is provided a process for producing the spindle-shaped goethite particles, which process comprises:

aging a water suspension containing a ferrous-containing precipitate produced by reacting a mixed aqueous alkali solution comprising an aqueous alkali carbonate solution and an aqueous alkali hydroxide solution with an aqueous ferrous salt solution in a non-oxidative atmosphere;

conducting an oxidation reaction of the water suspension by passing an oxygen-containing gas therethrough, thereby producing spindle-shaped goethite seed crystal particles, upon the production of the seed crystal particles, a Co compound being added in an amount of from 0.5 to less than 6 atm %, calculated as Co, based on whole Fe, to the water suspension containing the ferrous-containing precipitate during aging thereof but prior to the elapse of half a period of the whole aging time before initiation of the oxidation reaction, and the oxidation reaction being conducted such that 40 to 50% of whole $Fe^{2+}$ is oxidized; and after adding an Al compound in an amount of from more than 10 to less than 20 atm %, calculated as Al, based on a whole Fe, to the water suspension containing both the ferrous-containing precipitate and the spindle-shaped goethite seed crystal particles, passing again an oxygen-containing gas through the resultant water suspension so as to conduct an oxidation reaction thereof, thereby growing a goethite layer on the surface of each seed crystal particle.

In an eighth aspect of the present invention, there is provided a process for producing the spindle-shaped hematite particles, which process comprises:

aging a water suspension containing a ferrous-containing precipitate produced by reacting a mixed aqueous alkali solution comprising an aqueous alkali carbonate solution and an aqueous alkali hydroxide solution with an aqueous ferrous salt solution in a non-oxidative atmosphere;

conducting an oxidation reaction of the water suspension by passing an oxygen-containing gas therethrough, thereby producing spindle-shaped goethite seed crystal particles, upon the production of the seed crystal particles, a Co compound being added in an amount of from 0.5 to less than 6 atm %, calculated as Co, based on whole Fe, to the water suspension containing the ferrous-containing precipitate during aging thereof but prior to the elapse of half a period of the whole aging time before initiation of the oxidation reaction, and the oxidation reaction being conducted such that 40 to 50% of whole $Fe^{2+}$ is oxidized;

after adding an Al compound in an amount of from more than 10 to less than 20 atm %, calculated as Al, based on a whole Fe, to the water suspension containing both the ferrous-containing precipitate and the spindle-shaped goethite seed crystal particles, passing again an oxygen-containing gas through the resultant water suspension so as to conduct an oxidation reaction thereof, thereby growing a goethite layer on the surface of each seed crystal particle;

treating the spindle-shaped goethite particles obtained with an anti-sintering agent containing a rare earth compound in an amount of 1.5 to 5 atm %, calculated as a rare earth element, based on whole Fe; and heat-treating the thus treated spindle-shaped goethite particles at a temperature of 650 to 800° C.in a non-reducing atmosphere.

In a ninth aspect of the present invention, there is provided a process for producing the spindle-shaped magnetic metal particles containing iron as a main component, which process comprises:

aging a water suspension containing a ferrous-containing precipitate produced by reacting a mixed aqueous alkali solution comprising an aqueous alkali carbonate solution and an aqueous alkali hydroxide solution with an aqueous ferrous salt solution in a non-oxidative atmosphere;

conducting an oxidation reaction of the water suspension by passing an oxygen-containing gas therethrough, thereby producing spindle-shaped goethite seed crystal particles, upon the production of the seed crystal particles, a Co compound being added in an amount of from 0.5 to less than 6 atm %, calculated as Co, based on whole Fe, to the water suspension containing the ferrous-containing precipitate during aging thereof but prior to the elapse of half a period of the whole aging time before initiation of the oxidation reaction, and the oxidation reaction being conducted such that 40 to 50% of whole $Fe^{2+}$ is oxidized;

after adding an Al compound in an amount of from more than 10 to less than 20 atm %, calculated as Al, based on a whole Fe, to the water suspension containing both the ferrous-containing precipitate and the spindle-shaped goethite seed crystal particles, passing again an oxygen-containing gas through the resultant water suspension so as to conduct an oxidation reaction thereof, thereby growing a goethite layer on the surface of each seed crystal particle;

treating the spindle-shaped goethite particles obtained with an anti-sintering agent containing a rare earth compound in an amount of 1.5 to 5 atm %, calculated as a rare earth element, based on whole Fe;

heat-treating the thus treated spindle-shaped goethite particles at a temperature of 650 to 800° C. in a non-reducing atmosphere;

heat-reducing the spindle-shaped hematite particles obtained at 400 to 700° C. in a reducing atmosphere.

In a tenth aspect of the present invention, there is provided a magnetic recording medium comprising a non-magnetic substrate and a magnetic recording layer formed on the non-magnetic substrate comprising a binder resin and spindle-shaped magnetic metal particles containing iron as a main component, which have an average major axial diameter of 0.05 to 0.15 µm, an aspect ratio of 5:1 to 9:1, a size distribution (standard deviation/average major axial diameter) of not more than 0.30, a crystallite size $D_{110}$ of 130 to 160 Å, a Co content of from 0.5 to less than 6 atm % based on whole Fe; an Al content of from more than 10 to less than 20 atm % based on whole Fe, a rare earth element content of 1.5 to 5 atm % based on whole Fe, an atomic ratio of Al to Co of from more than 2 to 4, a coercive force of 111.4 to 143.2 kA/m, an oxidation stability of saturation magnetization ($\Delta\sigma s$) of not more than 10%, and an ignition temperature of not less than 130° C.

DETAILED DESCRIPTION OF THE INVENTION

Figure 1:
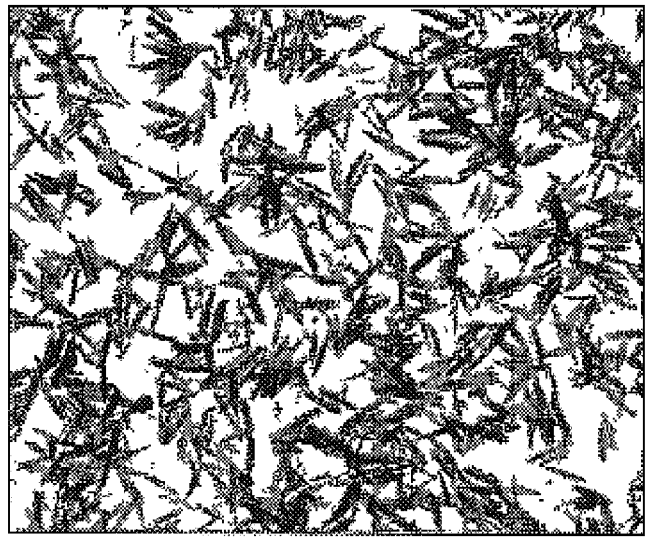
FIG. 1 is a transmission electron micrograph (×30,000) showing a shape of spindle-shaped goethite particle obtained in Example 1.

First, the spindle-shaped goethite particles of the present invention are described below.

The spindle-shaped goethite particles of the present invention have a cobalt content of usually from 0.5 to less than 6 atm %, preferably from 0.5 to less than 5 atm % based on whole Fe contained in the spindle-shaped goethite particles, an aluminum content of usually from more than 10 to less than 20 atm %, preferably from 10.5 to 18 atm % based on whole Fe contained in the spindle-shaped goethite particles, and an atomic ratio of Al to Co of usually from more than 2:1 to 4:1, preferably from 2.10:1 to 3.90:1.

When the Co content of the spindle-shaped goethite particles is less than 0.5 atm %, the magnetic metal particles containing iron as a main component obtained therefrom fails to show improved magnetic properties. When the Co content is not less than 6 atm %, it is difficult to adequately control the particle size, and the use of such a large amount of Co is economically disadvantageous. When the Al content is not more than 10 atm %, although the anti-sintering effect is attained, the coercive force of the obtained magnetic metal particles containing iron as a main component, especially those having a small particle size, becomes too large, thereby failing to adequately control the coercive force. When the Al content is not less than 20 atm %, particles other than goethite particles tend to be produced, so that the magnetic properties, especially saturation magnetization, of the obtained magnetic metal particles containing iron as a main component are deteriorated.

When the atomic ratio of Al to Co of the spindle-shaped goethite particles is not more than 2:1, it is difficult to adequately control the coercive force of the magnetic metal particles containing iron as a main component obtained therefrom. When the atomic ratio of Al to Co is more than 4, the crystal growth upon heat-reduction is inhibited, so that the saturation magnetization and oxidation stability of the obtained magnetic metal particles containing iron as a main component tend to be deteriorated.

The spindle-shaped goethite particles of the present invention are of a spindle shape, and have an average major axial diameter of usually 0.05 to 0.18 µm, preferably 0.009 to 0.18 µm; a size distribution (standard deviation/average major axial diameter) of usually not more than 0.20, preferably 0.10 to 0.18; and an aspect ratio of usually from more than 6:1 to less than 10:1, preferably 6:1 to 9:1.

When the average major axial diameter of the spindle-shaped goethite particles is less than 0.05 µm, the magnetic metal particles containing iron as a main component obtained therefrom have a too small particle size which is close to the particle size exhibiting a superparamagnetism, so that the saturation magnetization and coercive force of the magnetic metal particles containing iron as a main component, the dispersibility in coating composition containing the magnetic metal particles containing iron as a main component, and the oxidation stability of the magnetic metal particles containing iron as a main component tend to be deteriorated. When the average major axial diameter of the spindle-shaped goethite particles is more than 0.18 µm, it is difficult to obtain the magnetic metal particles containing iron as a main component having the aimed coercive force. Further, the coating film containing the magnetic metal particles containing iron as a main component tends to be deteriorated in surface smoothness due to the large particle size, thereby failing to improve the output characteristics thereof.

It is preferred that the size distribution of the spindle-shaped goethite particles of the present invention is as small as possible. Although the lower limit of the size distribution of the spindle-shaped goethite particles is not particularly restricted, in the consideration of industrial productivity, the size distribution is more preferably about 0.08 to about 0.12.

When the size distribution of the spindle-shaped goethite particles is more than 0.20, the magnetic metal particles containing iron as a main component obtained therefrom tend to be deteriorated in oxidation stability, thereby failing to achieve a high density recording performance of magnetic recording media. When the aspect ratio of the spindle-shaped goethite particles is less than 6:1, the aimed coercive force cannot be obtained. When the aspect ratio is not less than 10:1, the obtained magnetic metal particles containing iron as a main component exhibit a too high coercive force or are deteriorated in oxidation stability.

In addition, the spindle-shaped goethite particles of the present invention have a BET specific surface area of usually 130 to 200 $m^2/g$, preferably 150 to 200 $m^2/g$. When the BET specific surface area is less than 100 $m^2/g$, the obtained spindle-shaped goethite particles are relatively large in size, so that the magnetic metal particles containing iron as a main component obtained therefrom tend to fail to exhibit the aimed coercive force. When the BET specific surface area is more than 200 $m^2/g$, the coercive force of the spindle-shaped magnetic metal particles containing iron as a main component becomes so high beyond required level, resulting in deteriorated oxidation stability.

The spindle-shaped goethite particles of the present invention have a crystallite size $D_{020}$ of preferably 150 to 250 Å, more preferably 170 to 230 Å; a crystallite size $D_{110}$ of preferably 80 to 120 Å, more preferably 90 to 110 Å; and a crystallite size ratio of $D_{020}/D_{110}$ of preferably 1.8 to 2.4, more preferably 1.8 to 2.2. When the crystallite size ratio of $D_{020}/D_{110}$ is less than 1.8, the obtained spindle-shaped goethite particles tend to become insufficient in shape-retention property upon heat-dehydration or heat-reduction thereof. As a result, the magnetic metal particles containing iron as a main component obtained therefrom tend to be deteriorated in dispersibility in coating composition as well as coercive force distribution. When the crystallite size ratio of $D_{020}/D_{110}$ of the spindle-shaped goethite particles is more than 2.4, the magnetic metal particles containing iron as a main component obtained therefrom have the aimed particle size, but tend to fail to exhibit the aimed coercive force.

The spindle-shaped goethite particles of the present invention are each constituted by a seed crystal portion and a surface layer portion. Cobalt is present in both the seed crystal and surface layer portions, while aluminum is present only in the surface layer portion.

Here, the "seed crystal portion" means a goethite seed crystal particle produced by oxidizing the ferrous salt prior to the addition of the Al compound. More specifically, the seed crystal portion is a portion having a specific weight percentage of Fe determined by the oxidation percentage of $Fe^{2+}$, preferably a portion extending outwardly from the center of each goethite particle, which portion corresponds to an amount of usually 40 to 50% by weight based on whole Fe contained in the goethite particle.

The ratio of the crystallite size $D_{020}$ of the spindle-shaped goethite particle according to the present invention to the crystallite size $D_{020}$ of the seed crystal particle thereof [$D_{020}$(spindle-shaped goethite particle)/$D_{020}$(seed crystal particle)] is preferably 1.05 to 1.20; and the ratio of the crystallite size $D_{110}$ of the spindle-shaped goethite particle according to the present invention to the crystallite size $D_{110}$ of the seed crystal particle thereof [$D_{110}$(spindle-shaped goethite particle)/$D_{110}$(seed crystal particle)] is preferably 1.02 to 1.10. When the crystallite size ratio of $D_{020}$(spindle-shaped goethite particle)/$D_{020}$(seed crystal particle) is more than 1.20 or the crystallite size ratio of $D_{110}$(spindle-shaped goethite particle)/$D_{110}$(seed crystal particle) is more than 1.10, the goethite layer constituting the surface layer portion becomes too thick, so that it tends to be difficult to adequately control the shape of each goethite particle. When the crystallite size ratio of $D_{020}$(spindle-shaped goethite particle)/$D_{020}$(seed crystal particle) is less than 1.05 or the crystallite size ratio of $D_{110}$(spindle-shaped goethite particle)/$D_{110}$(seed crystal particle) is less than 1.02, the goethite layer constituting the surface layer portion becomes too thin, so that the anti-sintering effect tends to be considerably lowered upon the heat-dehydration and heat-reduction treatments.

The existence amount of Co (Co concentration) contained in the seed crystal portion is preferably 75 to 95, more preferably 80 to 90 based on the total amount of Co (Co concentration) contained in whole spindle-shaped goethite particle of the present invention, assuming that the total amount of Co (Co concentration) is 100. The existence amount of Co (Co concentration) contained in the surface layer portion is preferably 103 to 125, more preferably 106 to 120 based on the total amount of Co (Co concentration) contained in whole spindle-shaped goethite particle of the present invention.

When the existence amount of Co (Co concentration) contained in the seed crystal portion is less than 75 and the existence amount of Co (Co concentration) contained in the surface layer portion is more than 125, the Co content of the seed crystal portion becomes small, thereby failing to form a Co alloy, while the Co content of the surface layer becomes excessive, thereby failing to exhibit a adequate shape-retention property upon heat-reduction, and further resulting in deteriorated magnetic properties of the obtained magnetic metal particles containing iron as a main component. When the existence amount of Co (Co concentration) contained in the seed crystal portion is more than 95 and the existence amount of Co (Co concentration) contained in the surface layer portion is less than 103, although the Co content of the seed crystal portion is sufficient to form a Co alloy, the amount of Al contained in the surface layer portion becomes too large based on the amount of Co coexisting therein, thereby failing to form a Co alloy in the surface layer portion. As a result, the magnetic metal particles containing iron as a main component obtained from such spindle-shaped goethite particles tend to be deteriorated in magnetic properties as a whole.

Also, the "surface layer portion" means a goethite layer formed by the crystal growth on the goethite seed crystal particle after the addition of the Al compound during the growth reaction. More specifically, the surface layer portion is a portion extending inwardly from the outermost surface of each goethite particle, which portion corresponds to an amount of usually 50 to 60% by weight based on whole Fe contained in the goethite particle. Aluminum is present only in the surface layer portion. When a too large amount of Al is present in the surface layer portion, the crystal growth within each particle is inhibited. As a result, the magnetic metal particles containing iron as a main component obtained from such spindle-shaped goethite particles tend to fail to exhibit the aimed coercive force.

Next, the process for producing the spindle-shaped goethite particles according to the present invention is described below.

The spindle-shaped goethite particles according to the present invention are produced by first forming spindle-shaped goethite seed crystal particles and then growing a goethite layer on the surface of respective goethite seed crystal particles.

The spindle-shaped goethite seed crystal particles are obtained as follows. That is, in the production of the spindle-shaped goethite seed crystal particles comprising reacting an aqueous ferrous salt solution with a mixed aqueous alkali solution of an aqueous alkali carbonate solution and an aqueous alkali hydroxide solution; aging the resultant water suspension containing a ferrous-containing precipitate in a non-reducing atmosphere; and then passing an oxygen-containing gas through the water suspension to conduct an oxidation reaction thereof, a Co compound is added in an amount of usually from 0.5 to less than 6 atm %, preferably from 0.5 to less than 5 atm % (calculated as Co) based on whole Fe, to the water suspension containing the ferrous-containing precipitate during aging of the water suspension but prior to the elapse of half a period of the whole aging time before initiation of the oxidation reaction, and then the oxidation reaction for producing the spindle-shaped goethite seed crystal particles is conducted such that usually 40 to 50% of whole $Fe^{2+}$ is oxidized.

When the Co compound is added after the elapse of half a period of the whole aging time, goethite particles having the aimed particle size and aspect ratio cannot be obtained. In addition, when the oxidation percentage of whole $Fe^{2+}$ upon conducting the oxidation reaction is less than 40% or more than 50%, it is also difficult to obtain goethite particles having the aimed particle size and aspect ratio.

The aging of the water suspension is conducted at a temperature of preferably 40 to 8° C. in a non-oxidative atmosphere. When the aging temperature is less than 4° C., a sufficient aging effect cannot be attained, so that the obtained goethite particles have a small aspect ratio. When the aging temperature is more than 80° C., magnetite particles tend to be produced and mixed in the aimed goethite seed crystal particles. The aging time is usually 30 to 300 minutes. When the aging time is less than 30 minutes or more than 300 minutes, it becomes difficult to obtain particles having the aimed aspect ratio. In order to produce the non-oxidative atmosphere, an inert gas such as nitrogen or a reducing gas such as hydrogen may be passed though a reactor containing the water suspension.

As the aqueous ferrous salt solution used in the production reaction of the spindle-shaped goethite seed crystal particles, there may be used an aqueous ferrous sulfate solution, an aqueous ferrous chloride solution or the like. These solutions may be used singly or in the form of a mixture of any two or more thereof.

The mixed aqueous alkali solution used in the production reaction of the spindle-shaped goethite seed crystal particles may be produced by mixing an aqueous alkali carbonate solution with an aqueous alkali hydroxide solution. The mixing percentage of these aqueous solutions (% calculated as normality) is adjusted such that the concentration of the aqueous alkali hydroxide solution is preferably 10 to 40%, more preferably 15 to 35% (calculated as normality). When the concentration of the aqueous alkali hydroxide solution is less than 10%, there is a tendency that goethite particles having the aimed aspect ratio cannot be obtained. When the concentration of the aqueous alkali hydroxide solution is more than 40%, granular magnetite particles tend to be produced and mixed in the aimed spindle-shaped goethite seed crystal particles.

As the aqueous alkali carbonate solution, there may be used an aqueous sodium carbonate solution, an aqueous potassium carbonate solution, an aqueous ammonium carbonate solution or the like. As the aqueous alkali hydroxide solution, there may be used an aqueous sodium hydroxide solution, an aqueous potassium hydroxide solution or the like. These solutions may be respectively used singly or in the form of a mixture of any two or more thereof.

The amount of the mixed aqueous alkali solution used is usually 1.3 to 3.5, preferably 1.5 to 2.5 when expressed by the equivalent ratio of alkali contained therein to whole Fe contained in the aqueous ferrous salt solution. When the amount of the mixed aqueous alkali solution used is less than 1.3, magnetite particles tend to be produced and mixed in the aimed spindle-shaped goethite particles. When the amount of the mixed aqueous alkali solution used is more than 3.5, the use of such a large amount of alkali becomes industrially disadvantageous.

The ferrous ion concentration of the solution obtained by mixing the aqueous ferrous salt solution with the mixed aqueous alkali solution is preferably 0.1 to 1.0 mol/liter, more preferably 0.2 to 0.8 mol/liter. When the ferrous ion concentration is less than 0.1 mol/liter, the yield of the aimed goethite particles is lowered, resulting in industrially disadvantageous process. When the ferrous ion concentration is more than 1.0 mol/liter, the particle size distribution of the obtained particles becomes too broad.

The pH value of the solution used in the production reaction of the spindle-shaped goethite seed crystal particles is preferably 8.0 to 11.5, more preferably 8.5 to 11.0. When the pH value is less than 8.0, a large amount of acid radicals are contained in the obtained goethite particles. Since the acid radicals cannot be removed by simple washing method, the goethite particles tend to be sintered together when heat-treated to form magnetic metal particles containing iron as a main component. When the pH value is more than 11.5, the obtained magnetic metal particles containing iron as a main component tend to fail to exhibit the aimed coercive force.

The production of the spindle-shaped goethite seed crystal particles is conducted by the oxidation reaction, i.e., by passing an oxygen-containing gas such as air through the solution.

The superficial velocity of the oxygen-containing gas is preferably 0.5 to 3.5 cm/s, more preferably 1.0 to 3.0 cm/s. When the superficial velocity is less than 0.5 cm/s, the oxidation velocity is too low, so that granular magnetite particles tend to be produced and mixed in the aimed spindle-shaped seed crystal particles. When the superficial velocity is more than 3.5 cm/s, the oxidation velocity is too high, so that it becomes difficult to control the particle size as required. Here, the "superficial velocity" means an amount of the oxygen-containing gas passed per unit sectional area (bottom sectional area of a cylindrical reactor where the pore diameter and pore number of a perforated plate are ignored; unit: cm/sec).

The production reaction of the spindle-shaped goethite seed crystal particles may be sufficiently conducted at a temperature of not more than 80° C. When the reaction temperature is more than 80° C., magnetite particles tend to be produced and mixed in the aimed spindle-shaped goethite particles. The reaction temperature is preferably 45 to 55° C.

As the Co compound added in the production reaction of the spindle-shaped goethite seed crystal particles, there may be used cobalt sulfate, cobalt chloride, cobalt nitrate or the like. These Co compounds may be used singly or in the form of a mixture of any two or more thereof. The Co compound is added to the water suspension containing the ferrous-containing precipitate during the aging thereof before initiation of the oxidation reaction.

The amount of the Co compound added is usually from 0.5 to less than 6 atm %, preferably from 0.5 to less than 5 atm % based on whole Fe contained in the spindle-shaped goethite particles as a final product.

The pH value of the water suspension used in the growth reaction of the goethite layer is usually 8.0 to 11.5, preferably 8.5 to 11.0. When the pH value is less than 8.0, a large amount of acid radicals are contained in the obtained goethite particles. Since such acid radicals cannot be removed by simple washing method, the goethite particles tend to be sintered together when heat-treated to form magnetic metal particles containing iron as a main component. When the pH value is more than 11.5, it tends to be difficult to obtain particles having the aimed particle size distribution.

The growth of the goethite layer is conducted by the oxidation reaction, i.e., by passing an oxygen-containing gas such as air though the water suspension. The superficial velocity of the oxygen-containing gas used in the growth reaction of the goethite layer is preferably larger than that used in the production reaction of the seed crystal particles. When the superficial velocity used in the growth reaction of the goethite layer is not larger than that used in the production reaction of the seed crystal particles, the viscosity of the water suspension is increased by the addition of Al. As a result, the growth in the minor axial direction is more remarkably accelerated, so that the aspect ratio is decreased, thereby failing to obtain particles having the aimed aspect ratio. However, when the superficial velocity used in the production reaction of the seed crystal particles is not less than 2.0 cm/s, the above requirement is not needed.

The growth reaction of the goethite layer may be sufficiently conducted at a temperature of usually not more than 80° C. at which goethite particles can be produced. When the growth reaction temperature is more than 80° C., magnetite particles tend to be produced and mixed in the aimed goethite particles. The lower limit is 30° C. The growth reaction temperature is preferably 45 to 55° C.

As the Al compound added in the growth reaction of the goethite layer, there may be used acid salts such as aluminum sulfate, aluminum chloride and aluminum nitrate; and aluminates such as sodium aluminate, potassium aluminate and ammonium aluminate. These Al compounds may be used singly or in the form of a mixture of any two or more thereof.

In the growth reaction of the goethite layer, the Al compound may be added simultaneously with the oxidation reaction in which the oxygen-containing gas is passed through the water suspension at such a superficial velocity preferably larger than that used in the production reaction of the seed crystal particles. When the addition of the Al compound requires a long period of time, the oxygen-containing gas may be replaced with a nitrogen-containing gas so as not to accelerate the oxidation reaction. Meanwhile, when the addition of Al is prolonged, namely the Al compound is added in separate parts, continuously or intermittently while passing the oxygen-containing gas through the water suspension, it is not possible to sufficiently attain the effects of the present invention.

The amount of the Al compound added is usually from more than 10 to less than 20 atm % based on whole Fe contained in the spindle-shaped goethite particles as a final product.

Next, the spindle-shaped hematite particles of the present invention are described below.

The spindle-shaped hematite particles of the present invention contain Co in an amount of usually from 0.5 to less than 6 atm %, preferably from 0.5 to less than 5 atm % based on whole Fe contained in the spindle-shaped hematite particles; Al in an amount of usually from more than 10 to less than 20 atm %, preferably from 10.5 to 18 atm % based on whole Fe contained in the spindle-shaped hematite particles; a rare earth element in an amount of usually from 1.5 to 5 atm %, preferably from 2.0 to 4.8 atm % based on whole Fe contained in the spindle-shaped hematite particles, and have an atomic ratio of Al to Co of usually from more than 2 to 4, preferably from 2.10 to 3.90. The reasons why the Al and Co contents and the atomic ratio of Al to Co of the spindle-shaped hematite particles are defined to the above ranges, are the same as those described in the production of the goethite particles. When the rare earth element content of the spindle-shaped hematite particles is less than 1.5 atm %, a sufficient anti-sintering effect cannot be obtained. As a result, the magnetic metal particles containing iron as a main component obtained from such hematite particles are deteriorated in size distribution, and further the magnetic coating film produced therefrom is deteriorated in SFD. When the rare earth element content is more than 5 atm %, the saturation magnetization of the obtained magnetic metal particles containing iron as a main component is remarkably deteriorated.

The spindle-shaped hematite particles of the present invention are of a spindle shape, and have an average major axial diameter of usually 0.05 to 0.17 $\mu$m, preferably 0.08 to 0.17 $\mu$m; a size distribution (standard deviation/average major axial diameter) of usually not more than 0.22, preferably 0.10 to 0.21; and an aspect ratio of usually from more than 6:1 to less than 10:1, preferably 6:1 to 9:1.

When the average major axial diameter of the spindle-shaped hematite particles is less than 0.05 $\mu$m, the magnetic metal particles containing iron as a main component obtained therefrom have a too small particle size which is close to the particle size exhibiting a superparamagnetism, so that the saturation magnetization and coercive force of the magnetic metal particles containing iron as a main component as well as the dispersibility in coating composition containing the magnetic metal particles containing iron as a main component and the oxidation stability of the magnetic metal particles containing iron as a main component tend to be deteriorated. When the average major axial diameter of the spindle-shaped hematite particles is more than 0.17 $\mu$m, it is difficult to obtain the magnetic metal particles containing iron as a main component the aimed coercive force. In addition, since the particle size becomes too large, the obtained magnetic coating film containing the magnetic metal particles containing iron as a main component tends to be deteriorated in surface smoothness, resulting in poor output characteristics thereof.

It is preferred that the size distribution of the spindle-shaped hematite particles of the present invention is as small as possible. Although the lower limit of the size distribution is not particularly restricted, in the consideration of industrial productivity, the size distribution is more preferably about 0.08 to about 0.12. When the size distribution of the spindle-shaped hematite particles is more than 0.22, the obtained magnetic metal particles containing iron as a main component tends to be deteriorated in oxidation stability, thereby failing to obtain magnetic recording media having a high density recording performance. When the aspect ratio is not more than 6:1, there is a tendency that the obtained magnetic metal particles containing iron as a main component cannot exhibit the aimed coercive force. When the aspect ratio is not less than 10:1, the obtained magnetic metal particles containing iron as a main component tend to exhibit a too high coercive force or be deteriorated in oxidation stability.

The spindle-shaped hematite particles of the present invention have a BET specific surface area of preferably 40 to 70 m$^2$/g, more preferably 40 to 60 m$^2$/g. When the BET specific surface area is less than 40 m$^2$/g, the obtained hematite particles having the particle size specified by the present invention are already sintered together upon the heat-treatment and, therefore, tend to be deteriorated in size distribution. As a result, the magnetic metal particles containing iron as a main component obtained from such hematite particles also tend to be deteriorated in size distribution, and further the magnetic coating film produced using the magnetic metal particles containing iron as a main component tend to be deteriorated in SFD. When the BET specific surface area is more than 70 m$^2$/g, the anti-sintering effect becomes insufficient upon the heat-reduction treatment. As a result, the magnetic metal particles containing iron as a main component obtained from such hematite particles tend to be deteriorated in size distribution, and further the magnetic coating film produced therefrom tend to be deteriorated in SFD.

The spindle-shaped hematite particles of the present invention have a crystallite size $D_{104}$ of usually 100 to 140 Å, preferably 110 to 140 Å; a crystallite size $D_{110}$ of usually 200 to 300 Å, preferably 250 to 300 Å; and a crystallite size ratio $D_{110}/D_{104}$ of preferably 2.0 to 4.0, more preferably 2.0 to 3.0. When the crystallite size ratio $D_{110}/D_{104}$ is less than 2.0, excessive crystal growth of particles tends to be caused upon the heat-dehydration treatment. Therefore, in combination with the accelerated growth in the minor axial direction, the obtained particles tend to be deteriorated in particle size distribution. As a result, the magnetic metal particles containing iron as a main component obtained from the hematite particles tend to be lowered in coercive force and deteriorated in dispersibility. When the crystallite size ratio $D_{110}/D_{104}$ of the spindle-shaped hematite particles is more than 4.0, the crystal growth upon the heat-dehydration treatment is insufficient, so that a good shape-retention effect cannot be expected upon the heat-reduction treatment. As a result, the obtained magnetic metal particles containing iron as a main component tend to be deteriorated in coercive force and particle size distribution.

The spindle-shaped hematite particles of the present invention are each constituted from a seed crystal portion, an intermediate layer portion and an outermost layer portion. Cobalt is present in both the seed crystal and intermediate layer portions, while aluminum is present only in the intermediate layer portion and the rare earth element is present only in the outermost layer portion.

Here, the "seed crystal portion" of each hematite particle is the same as the seed crystal portion of the above goethite particle. The seed crystal portion is preferably a portion extending outwardly from the center of each hematite particle, which corresponds to the portion containing Fe in an amount of usually 40 to 50% by weight based on whole Fe contained in each hematite particle. The intermediate layer portion of each hematite particle is the same as the surface layer portion of the above goethite particle. The intermediate layer portion is preferably a portion extending inwardly from the inner surface of the rare earth element-containing outermost layer up to the outer surface of the seed crystal portion, which corresponds to a portion containing Fe in an amount of usually 50 to 60% by weight based on whole Fe contained in each hematite particle.

The existence amounts of Co (Co concentration) contained in the seed crystal portion and the intermediate layer portion are the same as those of the seed crystal portion and the surface layer portion of the above goethite particles. Meanwhile, Co may be present in the outermost layer portion, if required. In this case, Co contained in the outermost layer portion shows different effects from those contained in the seed crystal and intermediate layer portions, i.e., contributes to control of the reducing velocity as a whole or enhance the oxidation stability of the outermost surface, etc. Also, another important role of Co is that Co coexists together with Fe within each particle, thereby directly contributing to the formation of a Co—Fe alloy in the respective layers.

Next, the process for producing the spindle-shaped hematite particles according to the present invention is described below.

In the present invention, the surface of each spindle-shaped goethite particle is preferably preliminarily coated with an anti-sintering agent prior to heat-dehydration treatment thereof.

As the anti-sintering agent, there may be used rare earth compounds. Examples of the suitable rare earth compounds may include compounds of at least one element selected from the group consisting of scandium, yttrium, lanthanum, cerium, praseodymium, neodymium and samarium. The rare earth compounds may be in the form of chlorides, sulfates, nitrates or the like. The coating of the rare earth compound as anti-sintering agent may be conducted by either wet or dry method. Of these methods, the use of wet-coating method is preferred.

The amount of the rare earth compound used is preferably 1.5 to 5 atm %, more preferably 2.0 to 4.8 atm % (calculated as rare earth element) based on whole Fe.

By preliminarily coating the surface of each goethite particle with the anti-sintering agent, it is possible not only to inhibit the sintering of each particle and sintering between particles, but also to allow the spindle-shape hematite particles to retain the particle shape and aspect ratio of the spindle-shaped goethite particles, thereby ensuring the production of individual spindle-shaped magnetic metal particles containing iron as a main component which can retain the shape and aspect ratio of the raw spindle-shaped goethite particles.

The spindle-shaped goethite particles surface-coated with the anti-sintering agent may be heat-treated at a temperature of usually 650 to 800° C. in a non-reducing atmosphere. In this case, the heat-treatment is preferably conducted such that the ratio of crystallite size $D_{104}$ of the obtained spindle-shaped hematite particles to crystallite size $D_{110}$ of the spindle-shaped goethite particles [(crystallite size ratio of $D_{104}$(hematite)/$D_{110}$(goethite))] is within the range of usually 1.0 to 1.3, preferably 1.1 to 1.3.

When the heat-treating temperature is less than 650° C., the crystallite size ratio of $D_{104}$(hematite)/$D_{110}$(goethite) tends to become less than 1.0. As a result, the magnetic metal particles containing iron as a main component obtained from such spindle-shaped hematite particles tend to show a broad particle size distribution, so that the coating film produced therefrom tends to be deteriorated in SFD. When the heat-treating temperature is more than 800° C., the crystallite size ratio of $D_{104}$(hematite)/$D_{110}$(goethite) tends to be more than 1.3. Therefore, the obtained hematite particles tend to suffer from shape breakage and sintering. As a result, the magnetic metal particles containing iron as a main component obtained from such hematite particles tend to show a broad particle size distribution and include sintered portions therein, and the magnetic coating film produced therefrom tends to be deteriorated in both squareness and SFD.

After the heat-treatment, the obtained hematite particles may be rinsed in order to remove impurity salts such as $Na_2SO_4$ therefrom. In this case, the rinsing is preferably conducted so as to remove only undesired impurity salts without elution of the anti-sintering agent coated. More specifically, the rinsing can be effectively performed under a high pH condition in order to remove cationic impurities, and under a low pH condition in order to remove anionic impurities.

Next, the spindle-shaped magnetic metal particles containing iron as a main component according to the present invention are described below.

The spindle-shaped magnetic metal particles containing iron as a main component according to the present invention contain Co in an amount of usually from 0.5 to less than 6 atm %, preferably from 0.5 to less than 5 atm % based on whole Fe; Al in an amount of usually from more than 10 to less than 20 atm %, preferably from 10.5 to 18 atm % based on whole Fe; a rare earth element in an amount of usually from 1.5 to 5 atm %, preferably from 2.0 to 4.8 atm % based on whole Fe, and have an atomic ratio of Al to Co of usually from more than 2 to 4, preferably from 2.10 to 3.90. The reason why the Al and Co contents of the spindle-shaped magnetic metal particles containing iron as a main component are defined to the above-specified ranges, are the same as those described as to the Al and Co contents of the spindle-shaped hematite particles.

The spindle-shaped magnetic metal particles containing iron as a main component according to the present invention have an average major axial diameter of usually 0.05 to 0.15 μm, preferably 0.06 to 0.15 μm; a size distribution (standard deviation/average major axial diameter) of usually not more than 0.30, preferably 0.10 to 0.28; and an aspect ratio of usually 5:1 to 9:1, preferably 6:1 to 8:1.

When the average major axial diameter is less than 0.05 μm, the obtained magnetic metal particles containing iron as a main component have a too small particle size which is close to the particle size exhibiting a superparamagnetism, so that the saturation magnetization and coercive force as well as dispersibility in coating composition tend to be deteriorated, and the oxidation stability of the magnetic coating film obtained therefrom tends to be deteriorated. When the average major axial diameter is more than 0.15 μm, it is difficult to obtain the aimed coercive force. In addition, since the particle size becomes too large, the obtained magnetic coating film tends to be deteriorated in surface smoothness, resulting in poor output characteristics thereof.

The spindle-shaped magnetic metal particles containing iron as a main component of the present invention preferably have a size distribution as small as possible. Although the lower limit of the size distribution is not particularly restricted, in the consideration of industrial productivity, the lower limit of the size distribution of the spindle-shaped magnetic metal particles containing iron as a main component is preferably about 0.10. When the size distribution is more than 0.30, the obtained particles tends to be deteriorated in oxidation stability, and the magnetic coating film obtained therefrom tends to be deteriorated in SFD, thereby failing to attain a high density recording performance thereof. When the aspect ratio is less than 5:1, there is a tendency that the spindle-shaped magnetic metal particles containing iron as a main component cannot show the aimed coercive force, and the magnetic coating film is deteriorated in both squareness and orientation ratio. When the aspect ratio is more than 9:1, the obtained particles tend to exhibit a too high coercive force or be deteriorated in oxidation stability.

The spindle-shaped magnetic metal particles containing iron as a main component according to the present invention have a crystallite size $D_{110}$ of usually 130 to 160 Å, preferably 135 to 155 Å. When the crystallite size $D_{110}$ is less than 130 Å, although the noise of obtained magnetic recording media due to the particles is suitably reduced, the magnetic recording media are tend to be deteriorated in saturation magnetization and oxidation stability. When the crystallite size $D_{110}$ is more than 160 Å, the noise due to the particles is disadvantageously increased.

The spindle-shaped magnetic metal particles containing iron as a main component according to the present invention have a BET specific surface area of preferably 40 to 60 $m^2/g$, more preferably 45 to 60 $m^2/g$. When the BET specific surface area is less than 40 $m^2/g$, the obtained magnetic metal particles containing iron as a main component are already sintered together upon the previous heat-reduction treatment, so that it tends to be difficult to improve the squareness of the magnetic coating film obtained therefrom. When the BET specific surface area is more than 60 $m^2/g$, the viscosity of the obtained coating composition becomes too high to ensure a good dispersibility.

The spindle-shaped magnetic metal particles containing iron as a main component according to the present invention have a coercive force Hc of usually 111.4 to 143.2 kA/m (1,400 to 1,800 Oe), and a saturation magnetization σs of usually 110 to 160 $Am^2/kg$ (110 to 160 emu/g).

The spindle-shaped magnetic metal particles containing iron as a main component according to the present invention have an oxidation stability of saturation magnetization (Δσs) of usually not more than 10%, preferably not more than 9% as an absolute value, and an ignition temperature of usually not less than 130° C., preferably not less than 135° C., after being subjected to an accelerated deterioration test at a temperature of 60° C. and a relative humidity of 90% for one week.

As to properties of a coating film produced using the spindle-shaped magnetic metal particles containing iron as a main component according to the present invention, when the coating film is oriented by applying a magnetic field of 397.9 kA/m (5 kOe) thereto, the squareness (Br/Bm) thereof is preferably not less than 0.84, more preferably not less than 0.85; the orientation property (OR) thereof is preferably not less than 2.8, more preferably not less than 2.9; and the coercive force distribution (Switching Field Distribution: SFD) thereof is preferably not more than 0.53, more preferably not more than 0.52.

Also, when the coating film is oriented by applying a magnetic field of 238.7 kA/m (3 kOe) thereto, the squareness (Br/Bm) thereof is preferably not less than 0.82, more preferably not less than 0.83; the orientation property (OR) thereof is preferably not less than 2.6, more preferably not less than 2.7; and the coercive force distribution (SFD) thereof is preferably not more than 0.54, more preferably not more than 0.53.

The magnetic coating film produced using the spindle-shaped magnetic metal particles containing iron as a main component according to the present invention, have an oxidation stability (ΔBm) of preferably not more than 8.0%, more preferably not more than 7.5% when the magnetic coating film is oriented by applying a magnetic field of 397.9 kA/m (5 kOe) thereto.

Next, the process for producing the spindle-shaped magnetic metal particles containing iron as a main component according to the present invention is described below.

In the present invention, the spindle-shaped magnetic metal particles containing iron as a main component are produced by heat-reducing the spindle-shaped hematite particles of the present invention. The heat-reducing temperature is preferably 400 to 700° C. When the heat-reducing temperature is less than 400° C., the reduction reaction proceeds too slowly and, therefore, requires a long period of time. When the heat-reducing temperature is more than 700° C., the reduction reaction proceeds too rapidly, so that deformation of particles and sintering within each particle or between particles tend to be caused.

The spindle-shaped magnetic metal particles containing iron as a main component which are obtained by the heat-reduction, may be taken out in air by known methods, for example, the method of immersing the particles in an organic solvent such as toluene; the method of replacing the atmosphere around the heat-reduced spindle-shaped magnetic metal particles containing iron as a main component, with an inert gas, and then gradually increasing the oxygen content of the inert gas until the inert gas is completely replaced with air; and the method of gradually oxidizing the particles using a mixed gas of oxygen and water vapor.

Next, the magnetic recording medium according to the present invention will be described.

The magnetic recording medium according to the present invention comprises a non-magnetic substrate, and a magnetic recording layer which is formed on the non-magnetic substrate and comprising the magnetic metal particles containing iron as a main component and a binder resin.

As the non-magnetic substrate, there may be used those ordinarily used for magnetic recording media. Examples of the non-magnetic substrates may include films of synthetic resins such as polyethylene terephthalate, polyethylene, polypropylene, polycarbonates, polyethylene naphthalate, polyamides, polyamideimides and polyimides; foils or plates of metals such as aluminum and stainless steel; or various kinds of papers. The thickness of the non-magnetic substrate varies depending upon materials used, and is usually 1.0 to 300 $\mu$m, preferably 2.0 to 200 $\mu$m.

As the non-magnetic substrate for magnetic discs, there may be generally used a polyethylene terephthalate film having a thickness of usually 50 to 300 $\mu$m, preferably 60 to 200 $\mu$m. As the non-magnetic substrate for magnetic tapes, there may be used a polyethylene terephthalate film having a thickness of usually 3 to 100 $\mu$m, preferably 4 to 20 $\mu$m a polyethylene naphthalate film having a thickness of usually 3 to 50 $\mu$m preferably 4 to 20 $\mu$m, or a polyamide film having a thickness of usually 2 to 10 $\mu$m, preferably 3 to 7 $\mu$m.

As the binder resins, there may also be used those presently ordinarily used for the production of magnetic recording media. Examples of the binder resins may include vinyl chloride-vinyl acetate copolymer resins, urethane resins, vinyl chloride-vinyl acetate-maleic acid copolymer resins, urethane elastomers, butadiene-acrylonitrile copolymer resins, polyvinyl butyral, cellulose derivatives such as nitrocellulose, polyester resins, synthetic rubber-based resins such as polybutadiene, epoxy resins, polyamide resins, polyisocyanates, electron beam-curable acrylic urethane resins, or mixtures thereof.

The respective binder resins may contain a functional group such as —OH, —COOH, —SO$_3$M, —OPO$_2$M$_2$ and —NH$_2$ wherein M represents H, Na or K. In the consideration of the dispersibility of the magnetic metal particles containing iron as a main component in vehicle upon the production of a magnetic coating composition, the use of such binder resins containing —COOH or —SO$_3$M as a functional group is preferred.

The thickness of the magnetic recording layer formed on the non-magnetic substrate is usually 0.01 to 5.0 $\mu$m. If the thickness is less than 0.01 $\mu$m, uniform coating may be difficult, so that unfavorable phenomenon such as unevenness on the coating surface may be observed. On the contrary, when the thickness of the magnetic recording layer is more than 5.0 $\mu$m, it may be difficult to obtain desired electromagnetic performance due to an influence of diamagnetism. The thickness of the magnetic recording layer is preferably 0.05 to 4.0 $\mu$m.

The amount of the magnetic metal particles containing iron as a main component in the magnetic recording layer is usually 5 to 2,000 parts by weight, preferably 100 to 1,000 parts by weight based on 100 parts by weight of the binder resin.

When the amount of the magnetic metal particles containing iron as a main component is less than 5 parts by weight, the magnetic metal particles containing iron as a main component may not be continuously dispersed in a coating layer due to the too small content in a magnetic coating composition, resulting in insufficient surface smoothness and strength of the obtained coating layer. When the amount of the magnetic metal particles containing iron as a main component is more than 2,000 parts by weight, the magnetic metal particles containing iron as a main component may not be uniformly dispersed in the magnetic coating composition due to the too large content as compared to that of the binder resin. As a result, when such a magnetic coating composition is coated onto the substrate, it is difficult to obtain a coating film having a sufficient surface smoothness. Further, since the magnetic metal particles containing iron as a main component cannot be sufficiently bonded together by the binder resin, the obtained coating film becomes brittle.

The magnetic recording layer may further contain various additives used in ordinary magnetic recording media such as lubricants, abrasives and anti-static agents in an amount of 0.1 to 50 parts by weight based on 100 parts by weight of the binder resin.

The magnetic recording medium of the present invention has a coercive force value of usually 111.4 to 143.2 kA/m (1,400 to 1,800 Oe), and when the magnetic coating film is oriented by applying a magnetic field of 397.9 kA/m (5 kOe) thereto, a squareness (Br/Bm) of usually not less than 0.84, an orientation property (OR) of usually not less than 2.8, a coercive force distribution (Switching Field Distribution: SFD) of usually not more than 0.53 and an oxidation stability ($\Delta$Bm) of usually not more than 8.0%.

In the spindle-shaped goethite particles, the spindle-shaped hematite particles, the spindle-shaped magnetic metal particles containing iron as main component, and the processes for producing these respective particles, the point is that when the Co content, Al content and Al/Co ratio thereof are specified to the specified ranges, it is possible to obtain spindle-shaped magnetic metal particles containing iron as a main component which exhibit not only an adequate coercive force and good dispersibility and oxidation stability, but also an excellent coercive force distribution in spite of fine particles.

Conventionally, in order to obtain magnetic metal particles containing iron as a main component, which are excellent in magnetic properties and oxidation stability, it has been attempted to add various metals in the form of salts to the spindle-shaped goethite particles as a starting material. It is known that among these metals, Co forms a solid solution with iron in the obtained spindle-shaped magnetic metal particles containing iron as a main component, thereby enhancing the magnetization value and coercive force Hc thereof, and further improving the oxidation stability thereof. Therefore, it has been attempted to incorporate a large amount of cobalt into the magnetic metal particles in order to improve magnetic properties and oxidation stability thereof.

On the other hand, in the present invention, by specifying the Co and Al contents based on whole Fe, especially controlling the Al/Co ratio to the range of from more than 2 to 4, it becomes possible to obtain magnetic metal particles which exhibit an adequate coercive force and good dispersibility without deterioration of oxidation stability in spite of less Co content and fine particles. Meanwhile, the less amount of expensive Co added is also preferable from economical viewpoint.

In addition, in the present invention, when Co is added during aging step in the production reaction of the spindle-shaped goethite particles, the addition of Co is completed prior to the elapse of half a period of the whole aging time, and the oxidation reaction is controlled such that 40 to 50% of whole Fe is oxidized, so that the obtained goethite particles can exhibit a large minor axial diameter and a relatively small aspect ratio. Further, it has been found that when a magnetic coating film is prepared using the magnetic metal particles obtained by using the spindle-shaped goethite particles as a starting material, the squareness and orientation property of the obtained magnetic coating film can be remarkably enhanced.

The reason why the magnetic coating film having excellent sqaureness and orientation property can be produced in spite of using spindle-shaped goethite particles having a relatively small aspect ratio as starting material, is considered as follows. That is, by appropriately controlling the reaction conditions upon the addition of Co, the respective crystal planes ($D_{020}$, $D_{110}$) of goethite particles on which the surface layer has been formed, exhibit different crystal growth properties (crystallite sizes) from those of the goethite seed crystal particles, and the crystallite size ratio of $D_{020}/D_{110}$ is adjusted to preferably 1.8 to 2.4. In addition to the above conditions, owing to the relatively small aspect ratio, an extremely excellent anti-sintering effect can be exhibited upon the heat-treatment and heat-reduction for the production of magnetic metal particles, so that the shape breakage of the particles can be effectively inhibited.

In the case where the ratio of the crystallite size $D_{104}$ of the spindle-shaped hematite particles to the crystallite size $D_{110}$ of the spindle-shaped goethite particles as a starting material [crystallite size ratio of $D_{104}$(hematite)/$D_{110}$(goethite)] falls within the range of preferably 1.0 to 1.3 upon the heat-treatment prior to the heat reduction from the standpoint of improving the anti-sintering performance, it is possible to obtain the aimed spindle-shaped magnetic metal particles containing iron as a main component. Further, the magnetic coating film produced using such magnetic metal particles containing iron as a main component can show a high sqaureness, a high orientation property and a narrow coercive force distribution.

The reason why the magnetic coating film exhibiting a high sqaureness, a high orientation property and a narrow coercive force distribution can be obtained by defining the growth ratios of the specific crystal planes of the spindle-shaped goethite particles when converted into the spindle-shaped hematite particles, is considered as follows. That is, the obtained spindle-shaped hematite particles have a specific crystallite size ratio ($D_{110}/D_{104}$ is preferably 2.0 to 4.0), and the crystallite size is adjusted such that the crystal growth of the spindle-shaped hematite particles can adequately control a reducing velocity thereof upon the heat-treatment. As a result, the sintering upon the reduction is effectively inhibited, and more than necessary growth, i.e., excessive growth beyond the size of the skeleton particle is appropriately prevented, so that the sintering and shape breakage upon the heat-treatment can be extremely reduced.

The spindle-shaped magnetic metal particles containing iron as a main component according to the present invention can exhibit an adequate coercive force, excellent oxidation stability, good dispersibity and excellent coercive force distribution notwithstanding the magnetic metal particles containing iron as a main component are fine particles, especially have an average major axial diameter as small as 0.05 to 0.18 µm and, therefore, suitable as magnetic particles for magnetic recording media.

Since the spindle-shaped magnetic metal particles containing iron as a main component according to the present invention are fine particles and exhibit good dispersibility and excellent coercive force distribution, the magnetic recording medium produced using the magnetic metal particles containing iron as a main component can show a high image quality and a high output characteristics and, therefore, are excellent in recording reliability.

EXAMPLES

The present invention is described in more detail by Examples and Comparative Examples, but the Examples are only illustrative and, therefore, not intended to limit the scope of the present invention thereto.

Various properties were measured by the following methods.

(1) The average major axial diameter, average minor axial diameter and aspect ratio of particles are respectively expressed by averages of values measured by an electron microscope. The size distribution of the particles is expressed by the value obtained by dividing the standard deviation measured simultaneously with the above values, by the average major axial diameter.

(2) The Co, Al and rare earth contents were measured using an inductively coupled high-frequency plasma atomic emission spectroscope (SPS-4000 Model, manufactured by Seiko Denshi Kogyo Co., Ltd.).

(3) The specific surface area of particles is expressed by the value measured by BET method using "Monosorb MS-11" (manufactured by Cantachrom Co., Ltd.).

(4) The crystallite size of particles is expressed by the thickness of the crystallite in the direction perpendicular to each crystal plane of the respective particles measured by X-ray diffraction method. The value was calculated based on the X-ray diffraction peak curve prepared with respect to the respective crystal planes by using the following Scherrer's formula:

$$\text{Crystallite size} = K\lambda/\beta\cos\theta$$

wherein $\beta$ is a true half-width of the diffraction peak which was corrected with respect to the width of machine used (unit: radian); K is a Scherrer constant (=0.9); $\lambda$ is a wavelength of X-ray used (Cu K$\alpha$-ray 0.1542 nm); and $\theta$ is a diffraction angle (corresponding to a diffraction peak of the respective crystal planes).

(5) The magnetic properties of magnetic metal particles were measured using a vibration sample magnetometer "VSM-3S-15" (manufactured by Toei Kogyo Co., Ltd.) by applying an external magnetic field of 795.8 kA/m (10 kOe) thereto.

(6) The ignition temperature of magnetic metal particles was measured using TG/DTA measuring device "SSC5100TG/DTA22" (manufactured by Seiko Denshi Inc.).

(7) The magnetic properties of the magnetic coating film were measured by the following method.

The respective components as shown below were charged into a 100 cc polymer bottle, and then mixed and dispersed together for 8 hours using a paint shaker (manufactured by Reddevil Co., Ltd.), thereby preparing a magnetic coating composition. The thus prepared magnetic coating composition was coated on a 25 µm-thick polyethylene telephthalate film using an applicator to form a coating layer having a thickness of 50 µm thereon. The obtained coating film was then dried in respective magnetic fields of 3 kOe and 5 kOe, thereby obtaining a magnetic coating film. The thus obtained magnetic coating film was measured to determine magnetic properties thereof.

| Coating composition | |
|---|---|
| 3 mmφ steel balls | 800 parts by weight |
| Spindle-shaped magnetic metal particles containing iron as a main component | 100 parts by weight |
| Polyurethane resin having sodium sulfonate groups | 20 parts by weight |
| Cyclohexanone | 83.3 parts by weight |
| Methyl ethyl ketone | 83.3 parts by weight |
| Toluene | 83.3 parts by weight |

(8) The oxidation stability ($\Delta\sigma s$) of the saturation magnetization ($\sigma s$) of magnetic particles, and the oxidation stability ($\Delta Bm$) of saturation magnetic flux density (Bm) of the magnetic coating film were measured as follows.

The magnetic particles and the magnetic coating film were placed in a constant-temperature oven maintained at 60° C. and a relative humidity of 90%, and allowed to stand therein for one week to conduct an accelerated deterioration test. Thereafter, the particles and the magnetic coating film were measured to determine the saturation magnetization value and saturation magnetic flux density, respectively. The oxidation stability values $\Delta\sigma s$ and $\Delta Bm$ were calculated by dividing the difference (absolute value) between the values $\sigma s$ measured before and after the one-week accelerated test, and the difference (absolute value) between the values Bm measured before and after the one-week accelerated test, by the values $\sigma s$ and Bm measured before the accelerated test, respectively.

Example 1
<Production of Spindle-shaped Goethite Particles>

30 liters of a mixed aqueous alkali solution containing sodium carbonate and sodium hydroxide in amounts of 25 mol and 19 mol, respectively (the concentration of sodium hydroxide is equivalent to 27.5 mol % (calculated as normality) based on mixed alkali) were charged into a bubble tower whose temperature was adjusted to 47° C. while passing a nitrogen gas therethrough at a superficial velocity of 2.20 cm/s. Then, 20 liters of an aqueous ferrous sulfate solution containing 20 mol of $Fe^{2+}$ (the concentration of the mixed aqueous alkali solution is 1.725 equivalents (calculated as normality) based on the ferrous sulfate) were charged into the bubble tower and the contents of the bubble tower were aged therein for one hour and 15 minutes. Thereafter, 4 liters of an aqueous cobalt sulfate solution containing 0.96 mol of $Co^{2+}$ (equivalent to 4.8 atm % (calculated as Co) based on whole Fe) was added to the bubble tower and the contents of the bubble tower were further aged for 3 hours and 45 minutes (ratio of time required for Co addition to whole aging time: 25%). After aging, air was passed through the bubble tower at a superficial velocity of 2.30 cm/s to conduct the oxidation reaction until the oxidation percentage of $Fe^{2+}$ reached 40%, thereby producing goethite seed crystal particles.

The water suspension containing the goethite seed crystal particles and having a $Fe^{2+}$ oxidation percentage of 40%, was taken out from the bubble tower, rapidly washed with a diluted aqueous acetic acid solution, filtered and then washed with water. As a result of the composition analysis of the obtained goethite seed crystal particles, it was confirmed that the Fe content was 54.2% by weight and the Co content was 2.42% by weight, and the crystallite sizes $D_{020}$ and $D_{110}$ (seed crystal particles) were 186 Å and 101 Å, respectively.

Then, one liter of an aqueous aluminum sulfate solution containing 2.4 mol of $Al^{3+}$ (equivalent to 12.0 atm % (calculated as Al) based on whole Fe) was added at a feed rate of not more than 3 ml/s to conduct the oxidation reaction, and the reaction mixture was washed with water using a filter press until the electric conductivity reached 60 µS/cm, thereby obtaining a press cake.

A part of the obtained press cake was dried and pulverized by ordinary methods, thereby obtaining spindle-shaped goethite particles. As shown in the transmission electron micrograph of FIG. 1, the obtained goethite particles were of a spindle shape, and had an average major axial diameter of 0.173 µm, a standard deviation σ of 0.0288 µm, a size distribution (standard deviation/average major axial diameter) of 0.166, an average minor axial diameter of 0.0234 µm, an aspect ratio of 7.4:1 and a BET specific surface area of 175.7 m²/g. The obtained goethite particles contained no dendritic particles, and had as whole particles, a crystallite size $D_{020}$ of 197 Å, a crystallite size $D_{110}$ of 104 Å and a crystallite size ratio of $D_{020}/D_{110}$ of 1.89. Further, as to the relationship between the whole particles and the seed crystal particles, the crystallite size ratio of $D_{020}$(whole particles)/$D_{020}$(seed crystal particles) was 1.06, and the crystallite size ratio of $D_{110}$(whole particles)/$D_{110}$(seed crystal particles) was 1.03.

Further, the obtained goethite particles comprised 51.5% by weight of Fe, 2.61% by weight of Co and 2.98% by weight of Al. From the comparison of these values with those of the goethite seed crystal particles, it was confirmed that the Co content of the seed crystal portion of each goethite particle was 4.2 atm % based on Fe contained in the seed crystal portion. Also, it was confirmed that the existence amount of Co (Co concentration) contained in the seed crystal portion of each goethite particle was 88 based on whole Co (Co concentration) contained in the goethite particle, assuming that the existence amount of the whole Co (Co concentration) based on whole Fe is 100, and the existence amount of Co (Co concentration) contained in the surface layer portion of each goethite particle was 108 based on whole Co (Co concentration) contained in the goethite particle, assuming that the existence amount of the whole Co (Co concentration) based on whole Fe is 100. Furthermore, it was confirmed that the Co and Al contents of whole goethite particles was 4.8 atm % and 12.0 atm %, respectively, based on whole Fe, and Al was contained only in the surface layer portion.

Example 2
<Production of Spindle-shaped Hematite Particles>

The press cake containing 1,000 g (9.22 mol as Fe) of the spindle-shaped goethite particles obtained in Example 1 was sufficiently dispersed in 40 liters of water. Two liters of an aqueous neodymium nitrate solution containing 121.2 g of neodymium nitrate hexahydrate (equivalent to 3.0 atm % (calculated as Nd) based on whole Fe contained in the goethite particle) was added to the dispersion, and then stirred. Further, after a 25.0 wt % sodium carbonate aqueous solution as a precipitating agent was added so as to adjust the pH of the dispersion to 9.5, the dispersion was washed with water using a filter press. The obtained press cake was extrusion-molded using a compression molding machine equipped with a mold plate having an orifice diameter of 4 mm, and the resultant molded product was dried at 120° C., thereby obtaining a molded product containing goethite particles coated with the neodymium compound.

The goethite particles obtaining by pulverizing the molded product had a Co content of 4.8 atm % based on whole Fe; an Al content of 12.0 atm % based on whole Fe; a Nd content of 3.0 atm % based on whole Fe; and an atomic ratio of Al to Co of 2.50. In addition, it was confirmed that Al was present only in the intermediate layer portion of each goethite particle, and Nd was present only in the outermost layer portion thereof.

The spindle-shaped goethite particles coated with the neodymium compound were heat-dehydrated in air at 760° C. to obtain spindle-shaped hematite particles having an outermost layer composed of the neodymium compound, such that the ratio of the crystallite size $D_{104}$ of the obtained spindle-shaped hematite particles to the crystallite size $D_{110}$ of the spindle-shaped goethite particles [(crystallite size ratio of $D_{104}$(hematite)/$D_{110}$(goethite))] was in the range of 1.0 to 1.3.

Figure 2:
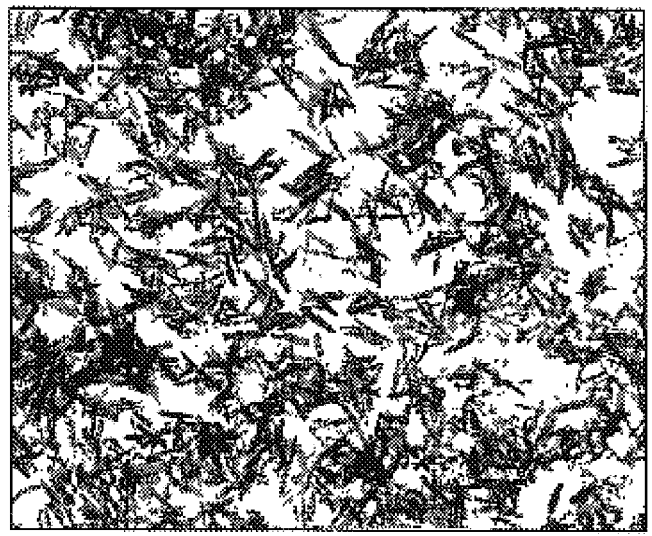
FIG. 2 is a transmission electron micrograph (×30,000) showing a shape of spindle-shaped hematite particle obtained in Example 1.

As shown in the transmission electron micrograph of FIG. 2, the obtained spindle-shaped hematite particles were of a spindle shape, and had an average major axial diameter of 0.158 μm, a standard deviation σ of 0.0293 μm, a size distribution (standard deviation/average major axial diameter) of 0.185, an average minor axial diameter of 0.0205 μm, an aspect ratio of 7.7:1 and a BET specific surface area of 43.5 m$^2$/g. In addition, it was confirmed that the Co content of the hematite particles was 4.8 atm % based on whole Fe; the Al content thereof was 12.0 atm % based on whole Fe; the Nd content thereof was 3.0 atm % based on whole Fe; and the atomic ratio of Al to Co was 2.50. Further, the obtained spindle-shaped hematite particles had a crystallite size $D_{104}$ of 127 Å and a crystallite size ratio of $D_{104}$(hematite)/$D_{110}$(goethite) of 1.22; and a crystallite size $D_{110}$ of 270 Å and a crystallite size ratio of $D_{110}$ (hematite)/$D_{104}$ (hematite) of 2.13.

Example 3
<Production of Spindle-shaped Magnetic Metal Particles Containing Iron as a Main Component>

100 g of the obtained spindle-shaped hematite particles having the outermost layer composed of the neodymium compound were charged into a fixed bed reducing apparatus having an inner diameter of 72 mm. The spindle-shaped hematite particles were heat-reduced at 480° C. by passing a hydrogen (H$_2$) gas through the reducing apparatus at a flow rate of 35 liter/minute. After the hydrogen gas was replaced with a nitrogen gas, the particles were cooled to 65° C., and then the oxygen partial pressure in the reducing apparatus was gradually increased by passing water vapor therethrough until the oxygen content therein reached the same content as in air, thereby forming a stable oxide film on the surface of each particle.

Figure 3:
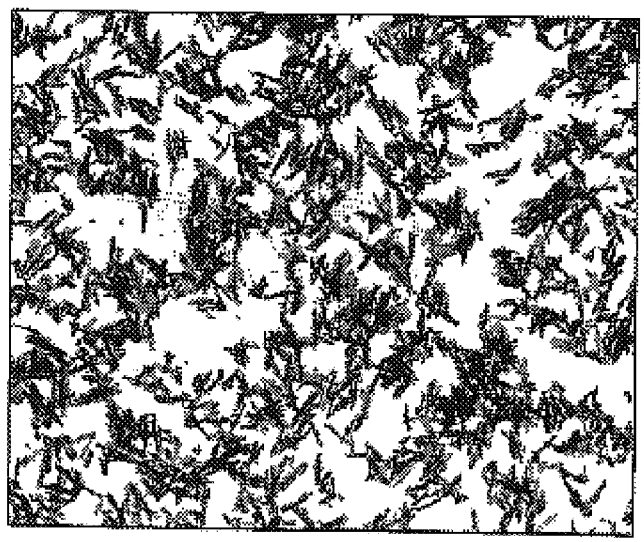
FIG. 3 is a transmission electron micrograph (×30,000) showing a shape of spindle-shaped magnetic metal particle obtained in Example 1.

As shown in the transmission electron micrograph of FIG. 3, the obtained magnetic metal particles containing iron as a main component had an average major axial diameter of 0.122 μm, a standard deviation σ of 0.0324 μm, a size distribution (standard deviation/average major axial diameter) of 0.266, an average minor axial diameter of 0.0175 μm, an aspect ratio of 7.0:1, a BET specific surface area of 51.7 m$^2$/g and a crystallite size $D_{110}$ of 145 Å. Further, the magnetic metal particles containing iron as a main component had a uniform particle size, and contained no dendritic particles. In addition, it was confirmed that the Co content of the magnetic metal particles containing iron as a main component was 4.8 atm % based on whole Fe; the Al content thereof was 12.0 atm % based on whole Fe; the Nd content thereof was 3.0 atm % based on whole Fe; and the atomic ratio of Al to Co was 2.50.

As to the magnetic properties of the spindle-shaped magnetic metal particles containing iron as a main component, the coercive force Hc thereof was 131.5 kA/m (1,653 Oe); the saturation magnetization value σs thereof was 130.0 Am$^2$/kg (130.0 emu/g); the squareness (σr/σs) thereof was 0.487; the oxidation stability Δσs of saturation magnetization thereof was 7.1% as an absolute value (measured value: −7.1%); and the ignition temperature thereof was 135° C.

Further, as to sheet magnetic characteristics of the spindle-shaped magnetic metal particles containing iron as a main component, when the sheet was oriented in a magnetic field of 397.9 kA/m (5 kOe), the sheet coercive force Hc was 131.0 kA/m (1,646 Oe); the sheet squareness (Br/Bm) was 0.852; the sheet orientation property (OR) was 3.22; the sheet SFD was 0.489; and ΔBm was 5.4% as an absolute value (measured value: −5.4%). Also, when the sheet was oriented in a magnetic field of 238.7 kA/m (3 kOe), the sheet coercive force Hc was 1,639 Oe; the sheet squareness (Br/Bm) was 0.842; the sheet orientation property (OR) was 3.10; the sheet SFD was 0.498; and ΔBm was 5.6% as an absolute value (measured value: −5.6%).

Examples 4 to 7 and Comparative Examples 1 to 3
<Production of Spindle-shaped Goethite Particles>

The same procedure as defined in Example 1 was conducted except that production conditions of spindle-shaped goethite particles, i.e., production reaction conditions and growth reaction conditions of goethite seed crystal particles, were varied as shown in Tables 1 and 2, thereby obtaining spindle-shaped goethite particles. Various properties of the obtained spindle-shaped goethite particles are shown in Table 3. Meanwhile, in Table 1, the alkali ratio was calculated from the following formula:

Alkali ratio=(½ alkali hydroxide)/(whole alkali) wherein whole alkali is a sum of ½ alkali hydroxide and alkali carbonate.

In addition, the equivalent ratio in Table 1 was calculated from the following formula:

Equivalent ratio=(whole alkali)/(Fe$^{2+}$) wherein whole alkali is a sum of ½ alkali hydroxide and alkali carbonate.

Examples 8 to 11 and Comparative Examples 4 to 10
<Production of Spindle-shaped Hematite Particles>

The same procedure as defined in Example 2 was conducted except that the spindle-shaped goethite particles obtained in Examples 4 to 7 and Comparative Examples 1 to 3 were used, and kind and amount of the coating material used for the anti-sintering treatment, the heat-dehydrating temperature and the subsequent heat-treatment temperature were varied, thereby producing spindle-shaped hematite particles. Production conditions are shown in Table 4, and various properties of the obtained spindle-shaped hematite particles are shown in Table 5.

Examples 12 to 15 and Comparative Examples 11 to 17
<Production of Spindle-shaped Magnetic Metal Particles>

The same procedure as defined in Example 3 was conducted except that the heat-reducing temperature was varied, thereby producing magnetic metal particles. Production conditions and various properties of the obtained spindle-shaped magnetic metal particles are shown in Tables 6 and 7, and various properties of the sheet produced using the spindle-shaped magnetic metal particles are shown in Table 8.

Example 16
<Production of Magnetic Recording Medium>

100 parts by weight of the spindle-shaped magnetic metal particles obtained in Example 3, 10.0 parts by weight of a vinyl chloride-vinyl acetate copolymer resin (tradename: MR-110, produced by Nippon Zeon Co., Ltd.), 23.3 parts by weight of cyclohexanone, 10.0 parts by weight of methyl ethyl ketone, 1.0 part by weight of carbon black particles (produced by Mitsubishi Chemical Corp., average particle size: 26 nm; BET specific surface area: 130 m$^2$/g) and 7.0 parts by weight of alumina particles "AKP-30"(tradename, produced by Sumitomo Kagaku Co., Ltd., average particle size: 0.4 μm) were kneaded together for 20 minutes using a kneader. The obtained kneaded material was diluted by adding 79.6 parts by weight of toluene, 110.2 parts by weight of methyl ethyl ketone and 17.8 parts by weight of cyclohexanone thereto, and then the resultant mixture was mixed and dispersed for 3 hours by a sand grinder, thereby obtaining a dispersion.

The obtained dispersion was mixed with 33.3 parts by weight of a solution prepared by dissolving 10.0 parts by weight (solid content) of a polyurethane resin (tradename: E-900, produced by Takeda Yakuhin Kogyo Co., Ltd.) in a mixed solvent containing methyl ethyl ketone and toluene at a mixing ratio of 1:1, and the resultant mixture was mixed and dispersed for 30 minutes by a sand grinder. Thereafter, the obtained dispersion was passed through a filter having a mesh size of 1 μm. The obtained filter cake was mixed under stirring with 12.1 parts by weight of a solution prepared by dissolving 1.0 part by weight of myristic acid and 3.0 parts by weight of butyl stearate in a mixed solvent containing methyl ethyl ketone, toluene and cyclohexanone at a mixing ratio (weight) of 5:3:2, and with 15.2 parts by weight of a solution prepared by dissolving 5.0 parts by weight of trifunctional low molecular weight polyisocyanate (tradename: E-31, produced by Takeda Yakuhin Kogyo Co., Ltd.) in a mixed solvent containing methyl ethyl ketone, toluene and cyclohexanone at a mixing ratio (weight) of 5:3:2, thereby producing a magnetic coating composition.

The obtained magnetic coating composition contained the following components:

| | |
|---|---|
| Spindle-shaped magnetic metal particles | 100 weight parts |
| Vinyl chloride-vinyl acetate copolymer resin | 10 weight parts |
| Polyurethane resin | 10 weight parts |
| Alumina particles | 7.0 weight parts |
| Carbon black fine particles | 1.0 weight part |
| Myristic acid | 1.0 weight part |
| Butyl stearate | 3.0 weight parts |
| Trifunctional low molecular weight polyisocyanate | 5.0 weight parts |
| Cyclohexanone | 56.6 weight parts |
| Methyl ethyl ketone | 141.5 weight parts |
| Toluene | 85.4 weight parts |

The obtained magnetic coating composition had a viscosity of 5,650 cP.

The thus obtained magnetic coating composition was passed through a filter having a mesh size of 1 μm. Thereafter, the magnetic coating composition was coated on a 12 μm-thick polyester base film using a slit coater having a gap width of 45 μm and then dried, thereby forming a magnetic layer on the base film. The surface of the obtained magnetic recording layer was calendered and smoothened by an ordinary method, and then the film was cut into a width of ½ inch (1.27 cm). The obtained tape was allowed to stand in a curing oven maintained at 60° C., for 24 hours to sufficiently cure the magnetic recording layer therein, thereby producing a magnetic tape. The obtained coating layer had a thickness of 3.5 μm.

With respect to magnetic properties of the obtained magnetic tape, the coercive force value thereof was 131.4 kA/m (1,651 Oe); the squareness (Br/Bm) thereof was 0.890; the sheet orientation property (OR) was 3.83; the sheet SFD was 0.441; and ΔBm was 4.2% as an absolute value (measured value: −4.2%).

TABLE 1

Production of goethite particles
Production reaction of goethite seed crystal particles
Mixed aqueous alkali solution

| Examples and Comparative Examples | Aqueous alkali carbonate solution | | Aqueous alkali hydroxide solution | | Alkali ratio*: (mol %) |
|---|---|---|---|---|---|
| | Kind | Amount used (mol) | Kind | Amount used (mol) | |
| Example 4 | Na$_2$CO$_3$ | 25 | NaOH | 19 | 27.5 |
| Example 5 | Na$_2$CO$_3$ | 25 | NaOH | 19 | 27.5 |
| Example 6 | Na$_2$CO$_3$ | 25 | NaGH | 19 | 27.5 |
| Example 7 | Na$_2$CO$_3$ | 25 | NaOH | 19 | 27.5 |
| Comparative Example 1 | Na$_2$CO$_3$ | 25 | NaOH | 19 | 27.5 |
| Comparative Example 2 | Na$_2$CO$_3$ | 25 | NaOH | 19 | 27.5 |
| Comparative Example 3 | Na$_2$CO$_3$ | 25 | NaOH | 19 | 27.5 |

Production of goethite particles
Production reaction of goethite seed crystal particles

| Examples and Comparative Examples | Aqueous ferrous salt solution | | Equivalent ratio** |
|---|---|---|---|
| | Kind | Amount used (mol) | |
| Example 4 | FeSO$_4$ | 20 | 1.725 |
| Example 5 | FeSO$_4$ | 20 | 1.725 |
| Example 6 | FeSO$_4$ | 20 | 1.725 |
| Example 7 | FeSO$_4$ | 20 | 1.725 |
| Comparative Example 1 | FeSO$_4$ | 20 | 1.725 |
| Comparative Example 2 | FeSO$_4$ | 20 | 1.725 |
| Comparative Example 3 | FeSO$_4$ | 20 | 1.725 |

Production of goethite particles
Production reaction of goethite seed crystal particles
Aging

| Examples and Comparative Examples | Temperature (° C.) | Time (hr) | Superficial velocity of nitrogen passed (cm/s) |
|---|---|---|---|

TABLE 1-continued

| | | | |
|---|---|---|---|
| Example 4 | 46 | 5 | 2.30 |
| Example 5 | 48 | 5 | 2.10 |
| Example 6 | 44 | 5 | 2.30 |
| Example 7 | 45 | 5 | 2.20 |
| Comparative Example 1 | 47 | 5 | 2.20 |
| Comparative Example 2 | 46 | 5 | 2.30 |
| Comparative Example 3 | 47 | 5 | 2.20 |

Production of goethite particles
Production reaction of goethite seed crystal particles
Cobalt compound

| Examples and Comparative Examples | Kind | Amount added (Co/Fe) (atom %) | Addition time after initiation of aging (hr) | (Co addition time)/(whole aging time) (%) |
|---|---|---|---|---|
| Example 4 | $CoSO_4$ | 3.5 | 1.50 | 30 |
| Example 5 | $CoSO_4$ | 3.0 | 1.00 | 20 |
| Example 6 | $CoSO_4$ | 4.5 | 2.25 | 45 |
| Example 7 | $CoSO_4$ | 4.0 | 1.75 | 35 |
| Comparative Example 1 | $CoSO_4$ | 4.5 | 3.00 | 60 |
| Comparative Example 2 | $CoSO_4$ | 3.5 | 1.50 | 30 |
| Comparative Example 3 | $CoSO_4$ | 4.5 | 1.25 | 25 |

Production of goethite particles
Production reaction of goethite seed crystal particles

| Examples and Comparative Examples | Superficial velocity of air passed (cm/s) | Temperature (° C.) |
|---|---|---|
| Example 4 | 2.40 | 46 |
| Example 5 | 2.20 | 48 |
| Example 6 | 2.60 | 44 |
| Example 7 | 2.45 | 45 |
| Comparative Example 1 | 2.40 | 47 |
| Comparative Example 2 | 2.40 | 46 |
| Comparative Example 3 | 2.40 | 47 |

Note:
*Alkali ratio = (½ · alkali hydroxide)/(whole alkali) wherein whole alkali is a sum of ½ · alkali hydroxide and alkali carbonate
Note
**Equivalent ratio = (whole alkali)/($Fe^{2+}$) wherein whole alkali is a sum of ½ · alkali hydroxide and alkali carbonate

TABLE 2

Production reaction of goethite particles
Growth reaction of seed crystal particles
Aluminum compound

| Examples and Comparative Examples | Kind | Amount added (Al/Fe) (atom %) | Addition time (oxidation percentage of $Fe^{2+}$) (%) | Superficial velocity of air passed (cm/s) |
|---|---|---|---|---|
| Example 4 | Aluminum sulfate | 10.5 | 40 | 2.40 |
| Example 5 | Aluminum sulfate | 11.0 | 40 | 2.20 |

TABLE 2-continued

Production reaction of goethite particles
Growth reaction of seed crystal particles
Aluminum compound

| Examples and Comparative Examples | Kind | Amount added (Al/Fe) (atom %) | Addition time (oxidation percentage of $Fe^{2+}$) (%) | Superficial velocity of air passed (cm/s) |
|---|---|---|---|---|
| Example 6 | Aluminum sulfate | 14.4 | 40 | 2.60 |
| Example 7 | Aluminum sulfate | 12.0 | 40 | 2.45 |
| Comparative Example 1 | Aluminum sulfate | 13.0 | 40 | 2.40 |
| Comparative Example 2 | Aluminum sulfate | 5.0 | 40 | 2.40 |
| Comparative Example 3 | Aluminum sulfate | 21.0 | 40 | 2.40 |

TABLE 3

Properties of goethite particles

| Examples and Comparative Examples | Shape | Average major axial diameter (l) (μm) | Standard deviation (δ) (μm) |
|---|---|---|---|
| Example 4 | Spindle-shaped | 0.151 | 0.0239 |
| Example 5 | Spindle-shaped | 0.179 | 0.0294 |
| Example 6 | Spindle-shaped | 0.089 | 0.0134 |
| Example 7 | Spindle-shaped | 0.132 | 0.0207 |
| Comparative Example 1 | Spindle-shaped | 0.061 | 0.0090 |
| Comparative Example 2 | Spindle-shaped | 0.149 | 0.0240 |
| Comparative Example 3 | Spindle-shaped | 0.171 | 0.0356 |

Properties of goethite particles

| Examples and Comparative Examples | Size distribution (σ/l) | Average minor axial diameter (μm) | Aspect ratio | BET specific surface area ($m^2/g$) |
|---|---|---|---|---|
| Example 4 | 0.158 | 0.0213 | 7.1:1 | 179.8 |
| Example 5 | 0.164 | 0.0208 | 8.6:1 | 161.8 |
| Example 6 | 0.151 | 0.0144 | 6.2:1 | 187.4 |
| Example 7 | 0.157 | 0.0194 | 6.8:1 | 169.2 |
| Comparative Example 1 | 0.148 | 0.0127 | 4.8:1 | 202.9 |
| Comparative Example 2 | 0.161 | 0.0204 | 7.3:1 | 163.4 |
| Comparative Example 3 | 0.208 | 0.0241 | 7.1:1 | 205.6 |

Properties of goethite particles
Composition of whole particles

| Examples and Comparative Examples | Co content (Co/Fe) (atom %) | Al content (Al/Fe) (atom %) | Al/Co (—) |
|---|---|---|---|
| Example 4 | 3.5 | 10.5 | 3.00 |
| Example 5 | 3.0 | 11.0 | 3.67 |
| Example 6 | 4.5 | 14.4 | 3.20 |

TABLE 3-continued

| | | | |
|---|---|---|---|
| Example 7 | 4.0 | 12.0 | 3.00 |
| Comparative Example 1 | 4.5 | 13.0 | 2.89 |
| Comparative Example 2 | 3.5 | 5.0 | 1.43 |
| Comparative Example 3 | 4.5 | 21.0 | 4.67 |

| | Properties of goethite particles Crystallite size | | | |
|---|---|---|---|---|
| Examples and | Seed crystal particles | | Whole particles | |
| Comparative Examples | $D_{020}(1)$ (Å) | $D_{110}(1)$ (Å) | $D_{020}$ (Å) | $D_{110}$ (Å) |
| Example 4 | 180 | 97 | 195 | 101 |
| Example 5 | 191 | 104 | 212 | 107 |
| Example 6 | 170 | 92 | 188 | 96 |
| Example 7 | 176 | 95 | 191 | 98 |
| Comparative Example 1 | 160 | 82 | 165 | 93 |
| Comparative Example 2 | 181 | 101 | 197 | 102 |
| Comparative Example 3 | 188 | 102 | 195 | 102 |

| Examples and Comparative Examples | Properties of goethite particles Crystallite size Crystallite size ratio | | |
|---|---|---|---|
| | $D_{020}/D_{110}$ | $D_{020}/D_{020}(1)$ | $D_{110}/D_{110}(1)$ |
| Example 4 | 1.93 | 1.08 | 1.04 |
| Example 5 | 1.98 | 1.11 | 1.03 |
| Example 6 | 1.96 | 1.11 | 1.04 |
| Example 7 | 1.95 | 1.09 | 1.03 |
| Comparative Example 1 | 1.77 | 1.03 | 1.13 |
| Comparative Example 2 | 1.93 | 1.09 | 1.01 |
| Comparative Example 3 | 1.91 | 1.04 | 1.00 |

TABLE 4

| | | Production conditions of hematite particles | |
|---|---|---|---|
| | | Anti-sintering treatment | |
| Examples and Comparative Examples | Goethite used | Kind of rare earth compound | Amount added (Re/Fe) (atom %) |
| Example 8 | Example 4 | Neodymium nitrate | 3.5 |
| Example 9 | Example 5 | Yttrium nitrate | 2.0 |
| Example 10 | Example 6 | Yttrium nitrate | 4.8 |
| Example 11 | Example 7 | Neodymium nitrate | 4.0 |
| Comparative Example 4 | Comparative Example 1 | Yttrium nitrate | 4.8 |
| Comparative Example 5 | Comparative Example 2 | Neodymium nitrate | 3.5 |
| Comparative Example 6 | Comparative Example 3 | Neodymium nitrate | 3.0 |
| Comparative Example 7 | Comparative Example 3 | Neodymium nitrate | 1.0 |
| Comparative Example 8 | Comparative Example 4 | Yttrium nitrate | 6.5 |
| Comparative Example 9 | Comparative Example 5 | Neodymium nitrate | 4.0 |
| Comparative Example 10 | Comparative Example 5 | Neodymium nitrate | 4.0 |

TABLE 4-continued

| | Production conditions of hematite particles | |
|---|---|---|
| Examples and | Heat-treatment | |
| Comparative Examples | Heating temperature (° C.) | Atmosphere |
| Example 8 | 750 | Air |
| Example 9 | 740 | Air |
| Example 10 | 680 | Air |
| Example 11 | 710 | Air |
| Comparative Example 4 | 680 | Air |
| Comparative Example 5 | 750 | Air |
| Comparative Example 6 | 750 | Air |
| Comparative Example 7 | 730 | Air |
| Comparative Example 8 | 740 | Air |
| Comparative Example 9 | 330 | Air |
| Comparative Example 10 | 850 | Air |

TABLE 5

| | Properties of hematite particles | | |
|---|---|---|---|
| Examples and Comparative Examples | Shape | Average major axial diameter (l) (μm) | Standard deviation (σ) (μm) |
| Example 8 | Spindle-shaped | 0.137 | 0.0240 |
| Example 9 | Spindle-shaped | 0.165 | 0.0299 |
| Example 10 | Spindle-shaped | 0.082 | 0.0135 |
| Example 11 | Spindle-shaped | 0.120 | 0.0205 |
| Comparative Example 4 | Spindle-shaped | 0.054 | 0.0098 |
| Comparative Example 5 | Spindle-shaped | 0.133 | 0.0313 |
| Comparative Example 6 | Spindle-shaped | 0.157 | 0.0316 |
| Comparative Example 7 | Spindle-shaped | 0.133 | 0.0295 |
| Comparative Example 8 | Spindle-shaped | 0.168 | 0.0296 |
| Comparative Example 9 | Spindle-shaped | 0.122 | 0.0206 |
| Comparative Example 10 | Spindle-shaped | 0.118 | 0.0269 |

| | Properties of hematite particles | | | |
|---|---|---|---|---|
| Examples and Comparative Examples | size distribution (σ/l) | Average minor axial diameter (μm) | Aspect ratio | BET specific surface area (m²/g) |
| Example 8 | 0.175 | 0.0185 | 7.4:1 | 44.8 |
| Example 9 | 0.181 | 0.0185 | 8.9:1 | 42.0 |
| Example 10 | 0.165 | 0.0126 | 6.5:1 | 55.8 |
| Example 11 | 0.171 | 0.0169 | 7.1:1 | 48.9 |
| Comparative Example 4 | 0.181 | 0.0110 | 4.9:1 | 54.1 |
| Comparative Example 5 | 0.235 | 0.0193 | 6.9:1 | 37.1 |
| Comparative Example 6 | 0.201 | 0.0201 | 7.8:1 | 70.5 |
| Comparative Example 7 | 0.222 | 0.0215 | 6.2:1 | 33.0 |
| Comparative Example 8 | 0.176 | 0.0183 | 9.2:1 | 55.6 |

TABLE 5-continued

| Examples and Comparative Examples | Co content (Co/Fe) (atom %) | Al content (Al/Fe) (atom %) | Rare earth content (Re/Fe) (atom %) | Al/Co ratio |
|---|---|---|---|---|
| Comparative Example 9 | 0.169 | 0.0169 | 7.2:1 | 123.3 |
| Comparative Example 10 | 0.228 | 0.0174 | 6.8:1 | 39.4 |

Properties of hematite particles
Composition of whole particles

| Examples and Comparative Examples | Co content (Co/Fe) (atom %) | Al content (Al/Fe) (atom %) | Rare earth content (Re/Fe) (atom %) | Al/Co ratio |
|---|---|---|---|---|
| Example 8 | 3.5 | 10.5 | 3.5 | 3.00 |
| Example 9 | 3.0 | 11.0 | 2.0 | 3.67 |
| Example 10 | 4.5 | 14.4 | 4.8 | 3.20 |
| Example 11 | 4.0 | 12.0 | 4.0 | 3.00 |
| Comparative Example 4 | 4.5 | 13.0 | 4.8 | 2.89 |
| Comparative Example 5 | 3.5 | 5.0 | 3.5 | 1.43 |
| Comparative Example 6 | 4.5 | 21.0 | 3.0 | 4.67 |
| Comparative Example 7 | 3.5 | 10.5 | 1.0 | 3.00 |
| Comparative Example 8 | 3.0 | 11.0 | 6.5 | 3.67 |
| Comparative Example 9 | 4.0 | 12.0 | 4.0 | 3.00 |
| Comparative Example 10 | 4.0 | 12.0 | 4.0 | 3.00 |

| Examples and Comparative Examples | Properties of hematite particles Crystallite size | |
|---|---|---|
| | $D_{104}$ (Å) | $D_{110}$ (Å) |
| Example 8 | 125 | 275 |
| Example 9 | 131 | 288 |
| Example 10 | 118 | 263 |
| Example 11 | 122 | 266 |
| Comparative Example 4 | 116 | 229 |
| Comparative Example 5 | 153 | 296 |
| Comparative Example 6 | 110 | 215 |
| Comparative Example 7 | 153 | 290 |
| Comparative Example 8 | 116 | 230 |
| Comparative Example 9 | 50 | 203 |
| Comparative Example 10 | 154 | 295 |

| Examples and Comparative Examples | Properties of hematite particles | | |
|---|---|---|---|
| | Crystallite size ratio ($D_{110}/D_{104}$) | Goethite crystallite ($D_{110}$ (g)) (Å) | Crystallite size ratio of hematite to goethite ($D_{104}/D_{110}$ (g)) |
| Example 8 | 2.20 | 101 | 1.24 |
| Example 9 | 2.20 | 107 | 1.22 |
| Example 10 | 2.23 | 96 | 1.23 |
| Example 11 | 2.18 | 98 | 1.24 |
| Comparative Example 4 | 1.97 | 93 | 1.25 |
| Comparative Example 5 | 1.93 | 102 | 1.50 |
| Comparative Example 6 | 1.95 | 102 | 1.08 |
| Comparative Example 7 | 1.90 | 101 | 1.51 |
| Comparative Example 8 | 1.98 | 107 | 1.08 |
| Comparative Example 9 | 4.06 | 98 | 0.51 |
| Comparative Example 10 | 1.92 | 98 | 1.57 |

TABLE 6

| Examples and Comparative Examples | Kind of hematite | Heat-reduction Reducing temperature (° C.) |
|---|---|---|
| Example 12 | Example 8 | 460 |
| Example 13 | Example 9 | 490 |
| Example 14 | Example 10 | 420 |
| Example 15 | Example 11 | 440 |
| Comparative Example 11 | Comparative Example 4 | 420 |
| Comparative Example 12 | Comparative Example 5 | 460 |
| Comparative Example 13 | Comparative Example 6 | 480 |
| Comparative Example 14 | Comparative Example 7 | 420 |
| Comparative Example 15 | Comparative Example 8 | 500 |
| Comparative Example 16 | Comparative Example 9 | 440 |
| Comparative Example 17 | Comparative Example 10 | 440 |

| Examples and Comparative Examples | Properties of magnetic metal particles containing iron as main component | | |
|---|---|---|---|
| | Average major axial diameter (l) (µm) | Standard deviation (σ) (µm) | Size distribution (σ/l) |
| Example 12 | 0.105 | 0.0267 | 0.254 |
| Example 13 | 0.128 | 0.0339 | 0.265 |
| Example 14 | 0.063 | 0.0150 | 0.238 |
| Example 15 | 0.092 | 0.0224 | 0.243 |
| Comparative Example 11 | 0.045 | 0.0100 | 0.252 |
| Comparative Example 12 | 0.100 | 0.0328 | 0.328 |
| Comparative Example 13 | 0.126 | 0.0383 | 0.304 |
| Comparative Example 14 | 0.098 | 0.0309 | 0.315 |
| Comparative Example 15 | 0.132 | 0.0366 | 0.277 |
| Comparative Example 16 | 0.090 | 0.0277 | 0.308 |
| Comparative Example 17 | 0.091 | 0.0274 | 0.301 |

| Examples and Comparative Examples | Properties of magnetic metal particles containing iron as main component | | |
|---|---|---|---|
| | Average minor axial diameter (µm) | Aspect ratio | BET specific surface area (m²/g) |
| Example 12 | 0.0154 | 6.8:1 | 50.3 |
| Example 13 | 0.0164 | 7.8:1 | 48.9 |
| Example 14 | 0.0102 | 6.2:1 | 58.7 |
| Example 15 | 0.0142 | 6.5:1 | 53.5 |
| Comparative Example 11 | 0.0100 | 4.5:1 | 53.9 |

TABLE 6-continued

| Examples and Comparative Examples | | | |
|---|---|---|---|
| Comparative Example 12 | 0.0164 | 6.1:1 | 38.6 |
| Comparative Example 13 | 0.0173 | 7.3:1 | 63.7 |
| Comparative Example 14 | 0.0169 | 5.8:1 | 34.4 |
| Comparative Example 15 | 0.0157 | 8.4:1 | 53.8 |
| Comparative Example 16 | 0.0143 | 6.3:1 | 39.8 |
| Comparative Example 17 | 0.0147 | 6.2:1 | 38.6 |

| Examples and Comparative Examples | Properties of magnetic metal particles containing iron as main component | | |
|---|---|---|---|
| | Crystallite size $D_{110}$ (Å) | Co content (Co/Fe) (atom %) | Al content (Al/Fe) (atom %) |
| Example 12 | 143 | 3.5 | 10.5 |
| Example 13 | 152 | 3.0 | 11.0 |
| Example 14 | 135 | 4.5 | 14.4 |
| Example 15 | 141 | 4.0 | 12.0 |
| Comparative Example 11 | 129 | 4.5 | 13.0 |
| Comparative Example 12 | 168 | 3.5 | 5.0 |
| Comparative Example 13 | 127 | 4.5 | 21.0 |
| Comparative Example 14 | 162 | 3.5 | 10.5 |
| Comparative Example 15 | 129 | 3.0 | 11.0 |
| Comparative Example 16 | 164 | 4.0 | 12.0 |
| Comparative Example 17 | 161 | 4.0 | 12.0 |

| Examples and Comparative Examples | Properties of magnetic metal particles containing iron as main component | |
|---|---|---|
| | Rare earth content (Re/Fe) (atom %) | Al/Co ratio |
| Example 12 | 3.5 | 3.00 |
| Example 13 | 2.0 | 3.67 |
| Example 14 | 4.8 | 3.20 |
| Example 15 | 4.0 | 3.00 |
| Comparative Example 11 | 4.8 | 2.89 |
| Comparative Example 12 | 3.5 | 1.43 |
| Comparative Example 13 | 3.0 | 4.67 |
| Comparative Example 14 | 1.0 | 3.00 |
| Comparative Example 15 | 6.5 | 3.67 |
| Comparative Example 16 | 4.0 | 3.00 |
| Comparative Example 17 | 4.0 | 3.00 |

TABLE 7

| Examples and Comparative Examples | Properties of magnetic metal particles containing iron as main component | | | |
|---|---|---|---|---|
| | Coercive force (Hc) | | Saturation magnetization (σs) | |
| | (kA/m) | (Oe) | (Am²/kg) | (emu/g) |
| Example 12 | 137.0 | 1,721 | 128.6 | 128.6 |
| Example 13 | 126.5 | 1,590 | 132.2 | 132.2 |
| Example 14 | 143.1 | 1,798 | 129.0 | 129.0 |
| Example 15 | 138.7 | 1,743 | 127.5 | 127.5 |
| Comparative Example 11 | 145.6 | 1,830 | 123.5 | 123.5 |
| Comparative Example 12 | 128.1 | 1,610 | 138.9 | 138.9 |
| Comparative Example 13 | 122.5 | 1,540 | 122.0 | 122.0 |
| Comparative Example 14 | 128.2 | 1,611 | 137.9 | 137.9 |
| Comparative Example 15 | 130.5 | 1,640 | 126.1 | 126.1 |
| Comparative Example 16 | 110.5 | 1,389 | 144.4 | 144.4 |
| Comparative Example 17 | 113.6 | 1,428 | 139.8 | 139.8 |

| Examples and Comparative Examples | Properties of magnetic metal particles containing iron as main component | | |
|---|---|---|---|
| | Squareness (σr/σs) | Oxidation stability of saturation magnetization (Δσs) (%) | Ignition temperature (° C.) |
| Example 12 | 0.490 | 6.9 | 137 |
| Example 13 | 0.486 | 6.0 | 141 |
| Example 14 | 0.494 | 6.5 | 139 |
| Example 15 | 0.488 | 6.2 | 143 |
| Comparative Example 11 | 0.483 | 11.2 | 122 |
| Comparative Example 12 | 0.481 | 10.5 | 126 |
| Comparative Example 13 | 0.488 | 11.0 | 124 |
| Comparative Example 14 | 0.482 | 8.9 | 133 |
| Comparative Example 15 | 0.489 | 10.2 | 127 |
| Comparative Example 16 | 0.476 | 9.7 | 129 |
| Comparative Example 17 | 0.478 | 8.9 | 131 |

TABLE 8

| Examples and Comparative Examples | Properties of magnetic coating film (when oriented in a magnetic field of 5 kOe) | | |
|---|---|---|---|
| | Coercive force (Hc) | | Squareness (Br/Bm) |
| | (kA/m) | (Oe) | |
| Example 12 | 136.1 | 1,710 | 0.850 |
| Example 13 | 124.9 | 1,570 | 0.854 |
| Example 14 | 142.8 | 1,795 | 0.846 |
| Example 15 | 138.1 | 1,736 | 0.848 |
| Comparative Example 11 | 145.8 | 1,832 | 0.833 |
| Comparative Example 12 | 126.5 | 1,590 | 0.838 |
| Comparative Example 13 | 119.6 | 1,503 | 0.830 |
| Comparative Example 14 | 124.8 | 1,568 | 0.833 |
| Comparative Example 15 | 129.7 | 1,630 | 0.842 |
| Comparative Example 16 | 108.3 | 1,361 | 0.824 |
| Comparative Example 17 | 111.5 | 1,401 | 0.829 |

TABLE 8-continued

| Examples and Comparative Examples | Properties of magnetic coating film (when oriented in a magnetic field of 5 kOe) | | |
|---|---|---|---|
| | Orientation property (OR) | SFD | ΔBm (%) |
| Example 12 | 3.18 | 0.496 | 5.3 |
| Example 13 | 3.30 | 0.488 | 4.7 |
| Example 14 | 2.99 | 0.492 | 5.1 |
| Example 15 | 3.05 | 0.495 | 4.8 |
| Comparative Example 11 | 2.77 | 0.537 | 9.2 |
| Comparative Example 12 | 2.78 | 0.544 | 8.9 |
| Comparative Example 13 | 2.65 | 0.567 | 9.1 |
| Comparative Example 14 | 2.65 | 0.564 | 7.8 |
| Comparative Example 15 | 3.01 | 0.521 | 9.5 |
| Comparative Example 16 | 2.45 | 0.589 | 8.6 |
| Comparative Example 17 | 2.52 | 0.571 | 7.8 |

| Examples and Comparative Examples | Properties of magnetic coating film (when oriented in a magnetic field of 3 kOe) | | |
|---|---|---|---|
| | Coercive force (Hc) | | Squareness |
| | (kA/m) | (Oe) | (Br/Bm) |
| Example 12 | 135.6 | 1,704 | 0.841 |
| Example 13 | 124.2 | 1,561 | 0.850 |
| Example 14 | 142.3 | 1,788 | 0.832 |
| Example 15 | 136.9 | 1,720 | 0.839 |
| Comparative Example 11 | 143.3 | 1,801 | 0.816 |
| Comparative Example 12 | 125.4 | 1,576 | 0.819 |
| Comparative Example 13 | 118.5 | 1,489 | 0.814 |
| Comparative Example 14 | 123.4 | 1,551 | 0.818 |
| Comparative Example 15 | 128.3 | 1,612 | 0.824 |
| Comparative Example 16 | 105.8 | 1,330 | 0.802 |
| Comparative Example 17 | 110.2 | 1,385 | 0.810 |

| Examples and Comparative Examples | Properties of magnetic coating film (when oriented in a magnetic field of 3 kOe) | | |
|---|---|---|---|
| | Orientation property (OR) | SFD | ΔBm (%) |
| Example 12 | 3.02 | 0.507 | 5.4 |
| Example 13 | 3.22 | 0.496 | 4.9 |
| Example 14 | 2.81 | 0.507 | 5.4 |
| Example 15 | 2.99 | 0.509 | 5.1 |
| Comparative Example 11 | 2.49 | 0.555 | 9.4 |
| Comparative Example 12 | 2.52 | 0.567 | 9.3 |
| Comparative Example 13 | 2.45 | 0.571 | 9.4 |
| Comparative Example 14 | 2.46 | 0.565 | 8.1 |
| Comparative Example 15 | 2.78 | 0.538 | 9.7 |
| Comparative Example 16 | 2.11 | 0.602 | 8.9 |
| Comparative Example 17 | 2.20 | 0.598 | 8.2 |

What is claimed is:

1. Spindle-shaped magnetic metal particles containing iron as a main component, having an average major axial diameter of 0.05 to 0.15 μm, an aspect ratio of from 5:1 to 9:1, a size distribution (standard deviation/average major axial diameter) of not more than 0.30, a crystallite size $D_{110}$ of 130 to 160 Å, a Co content of from 0.5 to less than 6 atm % based on total Fe, an Al content of from more than 10 to less than 20 atm % based on total Fe, a rare earth element content of from 1.5 to 5 atm % based on total Fe, an atomic ratio of Al to Co of from more than 2 to 4, a coercive force of 111.4 to 143.2 kA/m, an oxidation stability of saturation magnetization (Δσs) of not more than 10%, and an ignition temperature of not less than 130° C.

2. Spindle-shaped magnetic metal particle containing iron as a main component according to claim 1, which have a Co content of from 0.5 to less than 5 atm % based on total Fe, an Al content of from 10.5 to 18 atm % based on total Fe, a rare earth element content of from 2.0 to 4.8 atm % base on total Fe, and an atomic ratio of Al to Co of from 2.10 to 3.90.

3. Spindle-shaped magnetic metal particles containing iron as a main component according to claim 1, which further have a BET surface area of 40 to 60 m²/g.

4. Spindle-shaped magnetic metal particle containing iron as a main component containing iron as a main component, having an average major axial diameter of 0.05 to 0.15 μm, an aspect ratio of from 5:1 to 9:1, a size distribution (standard deviation/average major axial diameter) of not more than 0.30, a crystallite size $D_{110}$ of 130 to 160 Å, a Co content of from 0.5 to less than 5 atm % base on total Fe; an Al content of from 10.5 to less than 18 atm % based on total Fe, a rare earth element content of from 2.0 to 4.8 atm % based on total Fe, an atomic ratio of Al to Co of from 2.10 to 3.90, a coercive force of 111.4 to 143.2 kA/m, an oxidation stability of saturation magnetization (Δσs) of not more than 10%, and an ignition temperature of not less than 130° C.

5. A magnetic recording medium comprising a non-magnetic substrate and a magnetic recording layer formed on the non-magnetic substrate comprising a binder resin and spindle-shaped magnetic metal particles containing iron as a main component, which have an average major axial diameter of 0.05 to 0.15 μm, an aspect ratio of 5:1 to 9:1, a size distribution (standard deviation/average major axial diameter) of not more than 0.30, a crystallite size $D_{110}$ of 130 to 160 Å, a Co content of from 0.5 to less than 6 atm % based on total Fe; an Al content of from more than 10 to less than 20 atm % based on total Fe, a rare earth element content of 1.5 to 5 atm % based on total Fe, an atomic ratio of Al to Co of from more than 2 to 4, a coercive force of 111.4 to 143.2 kA/m, an oxidation stability of saturation magnetization (Δσs) of not more than 10%, and an ignition temperature of not less than 130° C.

6. A process for producing the spindle-shaped magnetic metal particles containing iron as a main component as defined in claim 1, which process comprises:
   aging for a period of time a water suspension containing a ferrous-containing precipitate produced by reacting a mixed aqueous alkali solution comprising an aqueous alkali carbonate solution and an aqueous alkali hydroxide solution with an aqueous salt solution in a non-oxidative atmosphere;
   conducting an oxidation of the aged water suspension containing a ferrous-containing precipitate by passing an oxygen-containing gas there through, the oxidation reaction being conducted such that 40 to 50% of the total $Fe^{2+}$ is oxidized, thereby producing spindle-shaped goethite seed crystal particles and;

adding to the water suspension containing the ferrous-containing precipitate, a Co compound in an amount of 0.5 to less than 6 atom %, calculated as Co, based on the total Fe, during the aging step thereof but prior to the elapse of half of the period of time of the aging step and before the oxidation reaction;

after the oxidation step adding an Al compound in an amount of from more than 10 to less than 20 atom %, calculated as Al, based on the total Fe, to the water suspension containing both the ferrous-containing precipitate and the spindle-shaped goethite seed crystal particles;

oxidizing the resultant Al containing water suspension by passing an oxygen-containing gas there through thereby growing a goethite layer on the surface of each of the spindle-shaped goethite seed crystal particle;

treating the resultant spindle-shaped goethite seed crystal particle having a goethite layer on the surface with an anti-sintering agent containing a rare earth compound in an amount of 1.5 to 5 atom %, calculated as a rare earth element, based on the total Fe;

heat-treating the resultant anti-sintering agent treated goethite seed crystal particle having a goethite layer on the surface at a temperature of 650 to 850° C. in a non-reducing atmosphere thereby producing spindle-shaped hematite particles;

heat-treating the spindle-shaped hematite particles at a temperature of 400 to 700° C. in a reducing atmosphere.

* * * * *